(12) United States Patent
Suzuki et al.

(10) Patent No.: US 12,083,899 B2
(45) Date of Patent: Sep. 10, 2024

(54) POWER SUPPLY SYSTEM

(71) Applicant: HONDA MOTOR CO., LTD., Tokyo (JP)

(72) Inventors: Kenta Suzuki, Tokyo (JP); Hirokazu Oguma, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 403 days.

(21) Appl. No.: 17/457,257

(22) Filed: Dec. 2, 2021

(65) Prior Publication Data

US 2022/0176823 A1 Jun. 9, 2022

(30) Foreign Application Priority Data

Dec. 3, 2020 (JP) ................. 2020-201116

(51) Int. Cl.
| | |
|---|---|
| *B60L 3/00* | (2019.01) |
| *B60L 7/10* | (2006.01) |
| *B60L 50/51* | (2019.01) |
| *B60L 58/13* | (2019.01) |
| *H01M 10/44* | (2006.01) |
| *H02J 7/00* | (2006.01) |

(52) U.S. Cl.
CPC .......... *B60L 3/0046* (2013.01); *B60L 50/51* (2019.02); *B60L 58/13* (2019.02); *H01M 10/441* (2013.01); *H02J 7/007* (2013.01); *B60L 7/10* (2013.01); *B60L 2210/10* (2013.01); *H01M 2220/20* (2013.01)

(58) Field of Classification Search
CPC ........ B60L 3/0046; B60L 50/51; B60L 58/13; B60L 7/10; B60L 2210/10; H01M 10/441; H01M 2220/20; H02J 7/007
See application file for complete search history.

(56) References Cited

U.S. PATENT DOCUMENTS

| | | | |
|---|---|---|---|
| 2015/0266386 A1* | 9/2015 | Matsuda | H02P 3/14 |
| | | | 320/109 |
| 2019/0299806 A1 | 10/2019 | Oyama et al. | |
| 2019/0299807 A1* | 10/2019 | Oyama | B60K 23/08 |
| 2021/0094441 A1* | 4/2021 | Sampson | B60K 1/02 |

FOREIGN PATENT DOCUMENTS

JP 2019180211 A 10/2019

* cited by examiner

*Primary Examiner* — Zoheb S Imtiaz
(74) *Attorney, Agent, or Firm* — CKC & Partners Co., LLC

(57) ABSTRACT

A power supply system includes a load circuit containing a drive motor coupled to a drive wheel; a first battery of capacity type; a second battery of output type; a power circuit connecting the load circuit, first battery and second battery; and a management ECU which controls flow of power between the first and second batteries and the drive motor, as well as flow of power from the first battery to the second battery, by operating the power circuit. The management ECU, in the case of a second SOC corresponding to the charge rate of the second battery being less than a second SOC lower limit value A, permits execution of power path control to supply the power outputted from the first battery to the second battery, and sets the second SOC lower limit value A to a greater value as the first SOC of the first battery becomes smaller.

5 Claims, 14 Drawing Sheets

POWER SUPPLY SYSTEM

This application is based on and claims the benefit of priority from Japanese Patent Application No. 2020-201116, filed on 3 Dec. 2020, the content of which is incorporated herein by reference.

BACKGROUND OF THE INVENTION

Field of the Invention

The present invention relates to a power supply system. In more detail, it relates to a power supply system of a vehicle equipped with two electrical storage devices having different characteristics.

Related Art

In recent years, development has been active in electric vehicles such as electric transport equipment equipped with a drive motor as a power generation source, and hybrid vehicles equipped with a drive motor and internal combustion engine as power generation sources. In such electric vehicles, an electrical storage device (battery, and capacitor etc.) for supplying electrical energy to the drive motor is also built in. In addition, in recent years, a vehicle equipped with a plurality of electrical storage devices having different characteristics in an electric vehicle has also been developed.

Patent Document 1 shows a power supply system for a vehicle in which a first battery of capacity type and a second battery of output type are connected to a drive motor via a power circuit. According to the power supply system of Patent Document 1, in the case of not being able to cover the power requested by the drive motor with only the power outputted from the first battery, it is possible to supplement this deficient amount with power outputted from the second battery. With the power supply system shown in Patent Document 1, in the case of an acceleration request arising from the driver, it is possible to output the power requested from the second battery, and the charging/discharging of the second battery is controlled so that the charge rate of the second battery is maintained within a predetermined target range, so as to deplete the regeneration power from the drive motor during regeneration by the second battery.

In addition, with the power supply system shown in Patent Document 1, in the case of the charge rate of the first battery being within a predetermined range, and the charge rate of the second battery being no more than a lower limit value of the above-mentioned target range, the execution of power path control of charging the second battery with the power outputted from the first battery is permitted so that the charge rate of the second battery charges to within the target range.

Patent Document 1: Japanese Unexamined Patent Application, Publication No. 2019-180211

SUMMARY OF THE INVENTION

However, there is a tendency of the power capable of being outputted from the first battery becoming lower as the charge rate of the first battery declines. For this reason, there is a tendency of the chances for the output from the second battery being requested increasing as the charge rate of the first battery declines. However, for the second battery which is of output type, since charging/discharging frequently switches compared to the first battery of capacity type, the charge rate thereof also fluctuates greatly up and down. For this reason, if the charge rate of the second battery is not sufficient when output from the second battery is requested, the second battery cannot sufficiently exhibit the output performance thereof. In other words, if the charge rate of the first battery declines, the chance of no longer being able to sufficiently exhibit the output performance of the second battery also increases.

The present invention has an object of providing a power supply system which can sufficiently exhibit the output performance of a second electrical storage device of output type, even when the charge rate of a first electrical storage device of capacity type declines.

A power supply system according to a first aspect of the present invention includes: a load circuit containing a rotary electrical machine coupled to a drive wheel; a first electrical storage device; a second electrical storage device having higher output weight density and lower energy weight density than the first electrical storage device; a power circuit which connects the load circuit, the first electrical storage device and the second electrical storage device; a first remaining amount parameter acquisition means for acquiring a first remaining amount parameter which increases according to a remaining amount of the first electrical storage device; a second remaining amount parameter acquisition means for acquiring a second remaining amount parameter which increases according to a remaining amount of the second electrical storage device; and a control device which controls flow of power between the first electrical storage device, the second electrical storage device and the rotary electrical machine, and flow of power from the first electrical storage device to the second electrical storage device, by operating the power circuit, in which the control device, in a case of the second remaining amount parameter being less than a second lower limit value, permits execution of power path control to supply power outputted from the first electrical storage device to the second electrical storage device, and sets the second lower limit value to a greater value as the first remaining amount parameter becomes smaller.

According to a second aspect of the present invention, in this case, it is preferable for the control device to execute regeneration control to supply regeneration power supplied from the rotary electrical machine to the power circuit to both or either of the first electrical storage device and the second electrical storage device during regeneration of the rotary electrical machine, and supply regeneration power more preferentially to the first electrical storage device than the second electrical storage device in a case of the second lower limit value being greater than a predetermined threshold.

According to a third aspect of the present invention, in this case, it is preferable for the control device to more preferentially discharge the second electrical storage device than the first electrical storage device, in a case of the second remaining amount parameter being larger than a second upper limit value set to a greater value than the second lower limit value, and to set the second upper limit value to a smaller value as the first remaining amount parameter becomes larger.

A power supply system according to a fourth aspect of the present invention includes: a load circuit containing a rotary electrical machine coupled to a drive wheel; a first electrical storage device; a second electrical storage device having higher output weight density and lower energy weight density than the first electrical storage device; a power circuit which connects the load circuit, the first electrical storage device and the second electrical storage device; a first remaining amount parameter acquisition means for acquiring a first remaining amount parameter which increases according to a remaining amount of the first electrical storage device; a second remaining amount parameter acquisition means for acquiring a second remaining amount parameter which increases according to a remaining amount of the second electrical storage device; and a control device which controls flow of power between the first electrical storage device, the second electrical storage device and the rotary electrical machine, and flow of power from the first electrical storage device to the second electrical storage device, by operating the power circuit, in which the control device, in a case of the second remaining amount parameter being outside a second target remaining amount range between a second lower limit value and a second upper limit value set to a value larger than the second lower limit value, controls charging and discharging of the second electrical storage device so that the second remaining amount parameter changes towards within the second target remaining amount range, and sets the second lower limit value to a larger value as the first remaining amount parameter becomes smaller.

According to a fifth aspect of the present invention, in this case, it is preferable for the control device to set the second upper limit value to a smaller value as the first remaining amount parameter becomes larger.

(1) In the power supply system according to the present invention, the control device permits execution of power path control for supplying power outputted from the first electrical storage device of capacity type to the second electrical storage device, in the case of the second remaining amount parameter of the second electrical storage device of output type being less than the second lower limit value. According to the power supply system, in the case of the second remaining amount parameter being less than the second lower limit value, it is thereby possible to raise the second remaining amount parameter of the second electrical storage device towards a value greater than the second lower limit value, so as to be able to exhibit the output performance thereof as requested. In addition, the control device increases the changes of executing power path control by setting the second lower limit value to a larger value as the first remaining amount parameter of the first electrical storage device becomes smaller. In other words, the control device can sufficiently exhibit the output performance of the second electrical storage device even when the first remaining amount parameter of the first electrical storage device declines, by increasing the chances of executing power path control as the first remaining amount parameter of the first electrical storage device becomes smaller, and as the chance of output from the second electrical storage device being requested increases.

(2) The control device executes regeneration control of supplying the regeneration power supplied from the rotary electrical machine to the power circuit to both or either one of the first electrical storage device and the second electrical storage device, during regeneration of the rotary electrical machine. In addition, the control device supplies regeneration power more preferentially to the first electrical storage device than the second electrical storage device, in the case of the second lower limit value being greater than a predetermined threshold. It is thereby possible to deplete the regeneration power by the first electrical storage device having high regeneration capacity.

(3) The control device causes the second electrical storage device to more preferentially discharge than the first electrical storage device, in the case of the second remaining amount parameter being greater than the second upper limit value which is set to a value greater than the second lower limit value. Since it is thereby possible to reduce the second remaining amount parameter of the second electrical storage device to between the second upper limit value and the second lower limit value, it is possible to ensure free capacity for recovering the regeneration power by the second electrical storage device. In addition, the control device sets the second upper limit value to a smaller value as the first remaining amount parameter becomes larger, i.e. as the regeneration capacity of the first electrical storage device declines. Since it is thereby possible to raise the regeneration capacity of the second electrical storage device in accordance with the decline in regeneration capacity of the first electrical storage device, it is possible to deplete the regeneration power by the second electrical storage device.

(4) In the power supply system according to the present invention, the control device controls the charging/discharging of the second electrical storage device so that the second remaining amount parameter changes towards within the second target remaining amount range, in the case of the second remaining amount parameter of the second electrical storage device which is of output type being outside the second target remaining amount range between the second lower limit value and the second upper limit value. According to the power supply system, it is thereby possible to configure so that, in the case of an output request arising, the output performance of the second electrical storage device is exhibited in response to this output request, and in the case of a regeneration request arising, the second remaining amount parameter is not made to greatly deviate from the second target remaining amount range, so as to be able to recover the regeneration power by the second electrical storage device in response to this regeneration request. In addition, the control device increases the changes of charging the second electrical storage device, by setting the second lower limit value to a larger value as the first remaining amount parameter of the first electrical storage device becomes smaller. In other words, the control device can sufficiently exhibit the output performance of the second electrical storage device even when the first remaining amount parameter of the first electrical storage device declines, by increasing the chance of charging the second electrical storage device as the first remaining amount parameter of the first electrical storage device becomes smaller, and the chance of output from the second electrical storage device being requested increases.

(5) The control device sets the second upper limit value to a larger value as the first remaining amount parameter becomes larger, i.e. as the regeneration capacity of the first electrical storage device declines. Since it is thereby possible to raise the regeneration capability of the second electrical storage device in accordance with a decline in the regeneration capacity of the first electrical storage device, it is possible to deplete the regeneration power by the second electrical storage device.

DETAILED DESCRIPTION OF THE INVENTION

Figure 1:
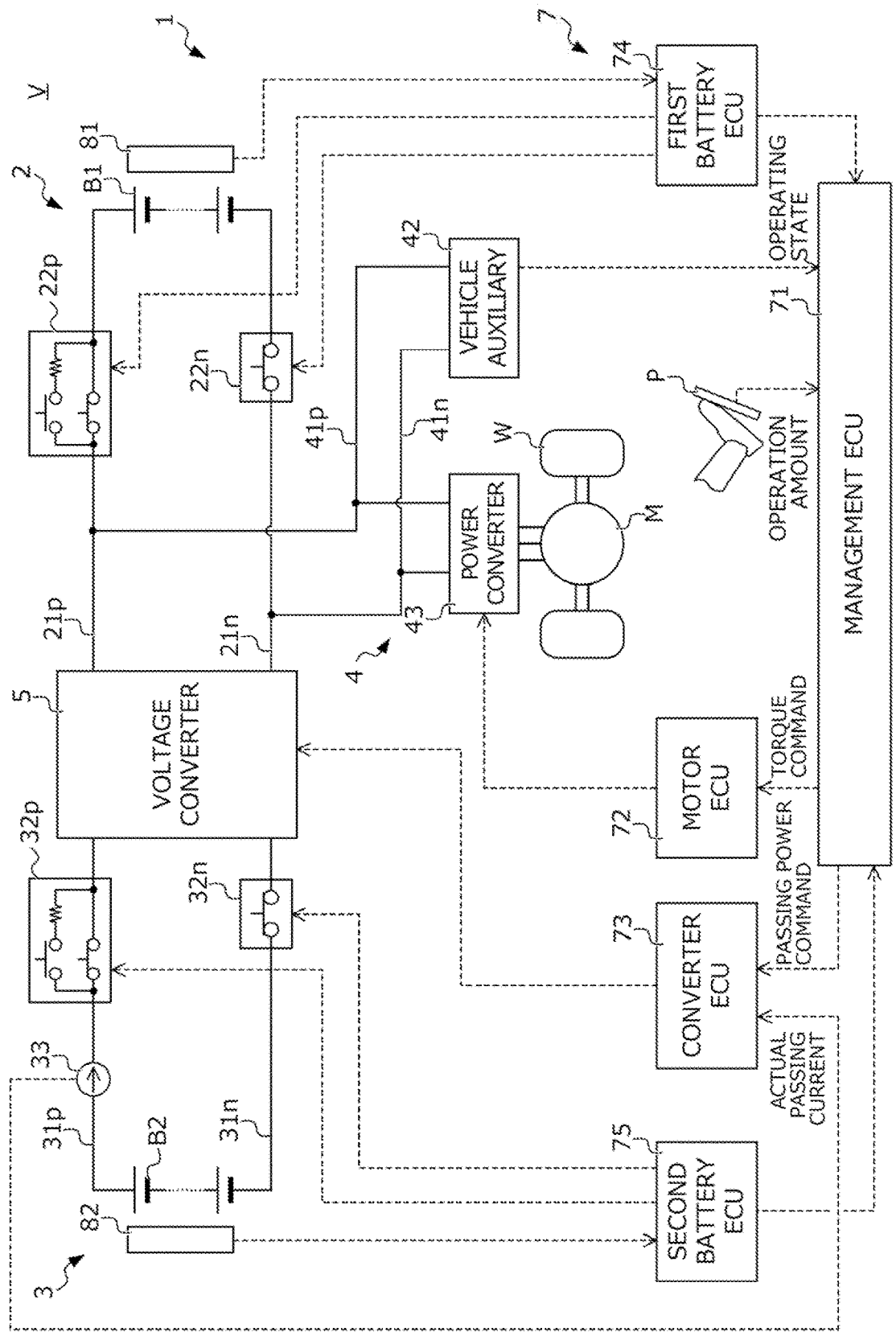
FIG. 1 is a view showing the configuration of an electric vehicle equipped with a power supply system according to an embodiment of the present invention.

Hereinafter, an embodiment of the present invention will be explained while referencing the drawings. FIG. 1 is a view showing the configuration of an electric vehicle V (hereinafter simply referred to as "vehicle") equipped with a power supply system 1 according to the present embodiment.

The vehicle V includes drive wheels W, a drive motor M serving as a rotary electrical machine coupled to these drive wheels W; and a power supply system 1 which performs transferring of power between this drive motor M and a first battery B1 and second battery B2 described later. It should be noted that the present embodiment explains an example in which the vehicle V accelerates and decelerates by the motive power generated mainly by the drive motor M; however, the present invention is not to be limited thereto. The vehicle V may be established as a so-called hybrid vehicle equipped with the drive motor M and an engine as the motive power generation source.

The drive motor M is coupled to the drive wheels W via a power transmission system which is not illustrated. The drive torque generated by the drive motor M by supplying three-phase electricity to the drive motor M from the power supply system 1 is transferred to the drive wheels W via the power transmission system which is not illustrated, causing the drive wheels W to rotate to make the vehicle V travel. In addition, the drive motor M exhibits a function of a generator during deceleration of the vehicle V, generates regenerative electric power, and gives the regenerative braking torque to the drive wheels W responsive to the magnitude of this regenerative electric power. The regenerative electric power generated by the drive motor M is charged to the batteries B1, B2 of the power supply system 1 as appropriate.

The power supply system 1 includes: a first power circuit 2 to which the first battery B1 serving as a first electrical storage device is connected; a second power circuit 3 to which the second battery B2 serving as a second electrical storage device is connected; a voltage converter 5 connecting this first power circuit 2 and second power circuit 3; a load circuit 4 having various electrical loads including the drive motor M; and an electronic control unit group 7 which operates these power circuits 2, 3, 4 and voltage converter 5. In other words, in the power supply system 1, the power circuit connecting the first battery B1 and second battery B2 with the load circuit 4 is configured by the first power circuit 2, second power circuit 3 and voltage converter 5. In addition, the control device operating this drive circuit and controlling the flow of power between the first battery B1, second battery B2 and load circuit 4, as well as the flow of power from the first battery B1 to the second battery B2, is configured by the electronic control unit group 7. The electronic control unit group 7 includes a management ECU 71, motor ECU 72, converter ECU 73, first battery ECU 74 and second battery ECU 75, which are each computer.

The first battery B1 is a secondary battery capable of both discharging which converts chemical energy into electrical energy, and charging which converts the electrical energy into chemical energy. Hereinafter, a case is explained using a so-called lithium-ion battery which performs charging/discharging by the lithium ions migrating between electrodes as this first battery B1; however, the present invention is not limited thereto. A capacitor may be used as the first battery B1.

A first battery sensor unit 81 for estimating the internal state of the first battery B1 is provided to the first battery B1. The first battery sensor unit 81 detects a physical quantity required in order to acquire the charge rate of the first battery B1 (value expressing the charged amount of the battery by percentage; increases according to the remaining amount of the first battery B1), the temperature, etc. in the first battery ECU 74, and is configured by a plurality of sensors which send signals according to the detection value to the first battery ECU 74. More specifically, the first battery sensor unit 81 is configured by a voltage sensor that detects the terminal voltage of the first battery B1, a current sensor that detects the electrical current flowing in the first battery B1, a temperature sensor that detects the temperature of the first battery B1, etc. Hereinafter, the charge rate of the first battery B1 is also referred to as first SOC. Therefore, in the present embodiment, the first remaining amount parameter acquisition means for acquiring the first SOC which increases according to the remaining amount of the first battery B1 is configured by the first battery sensor unit 81 and first battery ECU 74.

The second battery B2 is a secondary battery capable of both discharging that converts chemical energy into electrical energy, and charging that converts electrical energy into chemical energy. Hereinafter, a case is explained using a so-called lithium-ion battery which performs charging/discharging by the lithium ions migrating between electrodes as this second battery B2; however, the present invention is not limited thereto. The second battery B2 may employ capacitors, for example.

A second battery sensor unit 82 for estimating the internal state of the second battery B2 is provided to the second battery B2. The second battery sensor unit 82 detects a physical quantity required for acquiring the charge rate, temperature, etc. of the second battery B2 in the second battery ECU 75, and is configured by a plurality of sensors which send signals according to the detection value to the second battery ECU 75. More specifically, the second battery sensor unit 82 is configured by a voltage sensor that detects terminal voltage of the second battery B2, a current sensor that detects the electrical current flowing in the second battery B2, a temperature sensor that detects the temperature of the second battery B2, etc. Hereinafter, the charge rate of the second battery B2 is also referred to as second SOC. Therefore, in the present embodiment, the second remaining amount parameter acquisition means for acquiring the second SOC which increases according to the remaining amount of the second battery B2 is configured by the second battery sensor unit 82 and the second battery ECU 75.

Herein, the characteristics of the first battery B1 and the characteristics of the second battery B2 are compared. The first battery B1 has lower output weight density and higher energy weight density than the second battery B2. In addition, the first battery B1 has larger capacity than the second battery B2. In other words, the first battery B1 is superior to the second battery B2 in the point of energy weight density. It should be noted that energy weight density is the electrical energy per unit weight (Wh/kg), and the output weight density is the power per unit weight (W/kg). Therefore, the first battery B1 which excels in the energy weight density is a capacitive battery with the main object of high capacity and the second battery B2 which excels in output weight density is an output-type battery with the main object of high output. For this reason, the power supply system 1 uses the first battery B1 as the main power source, and uses the second battery B2 as an auxiliary power source which supplements the first battery B1.

The static voltage of the batteries B1, B2 (i.e. voltage in a state in which electrical current is not flowing to the battery, referred to as open circuit voltage) has a characteristic of rising with higher charge rate. In addition, the static voltage of the first battery B1 when the first SOC of the first battery B1 is the minimum value, i.e. minimum value of the static voltage of the first battery B1, is higher than the static voltage of the second battery B2 when the second SOC of the second battery B2 is the maximum value (full charge state), i.e. maximum value of static voltage of the second battery B2. For this reason, the static voltage of the second battery B2 during travel of the vehicle V is basically maintained lower than the static voltage of the first battery B1.

The first output circuit 2 includes; the first battery B1, first power lines 21$p$, 21$n$ which connect both positive and negative poles of this first battery B1 and the positive terminal and negative terminal on the high-voltage side of the voltage converter 5, and a positive contactor 22$p$ and negative contactor 22$n$ provided to these first power lines 21$p$, 21$n$.

The contactors 22$p$, 22$n$ are normal open type which opens in a state in which a command signal from outside is not being inputted and breaks conduction between both electrodes of the first battery B1 and the first power lines 21$p$, 21$n$; and closes in a state in which a command signal is being inputted and connects the first battery B1 and first power lines 21$p$, 21$n$. These contactors 22$p$, 22$n$ open/close according to a command signal transmitted from the first battery ECU 74. It should be noted that the positive contactor 22$p$ is a pre-charge contactor having a pre-charge resistance for mitigating the inrush current to a plurality of smoothing capacitors provided to the first power circuit 2, load circuit 4, etc.

The second power circuit 3 includes: the second battery B2, second power lines 31$p$, 31$n$ which connect both positive and negative poles of this second battery B2 and the positive terminal and negative terminal on the low-voltage side of the voltage converter 5, a positive contactor 32$p$ and negative contactor 32$n$ provided to these second power lines 31$p$, 31$n$, and a current sensor 33 provided to the second power line 31$p$.

The contactors 32$p$, 32$n$ are normal-open type which open in a state in which a command signal from outside is not being inputted to break conduction between both electrodes of the second battery B2 and the second power lines 31$p$, 31$n$, and close in a state in which a command signal is being inputted to connect between the second battery B2 and the second power lines 31$p$, 31$n$. These contactors 32$p$, 32$n$ open/close in response to a command signal transmitted from the second battery ECU 75. It should be noted that the cathode contactor 32$p$ is a pre-charge contactor having a pre-charge resistance for mitigating the inrush current to a plurality of smoothing capacitors provided to the first power circuit 2, load circuit 4, etc.

The electric current sensor 33 sends a detection signal according to a value of passing current, which is the electrical current flowing through the second power line 31$p$, i.e. electrical current flowing through the voltage converter 5, to the converter ECU 73. It should be noted that, in the present embodiment, the direction of passing current defines from the second power circuit 3 side to the first power circuit 2 side as positive, and defines from the first power circuit 2 side to the second power circuit 3 side as negative.

The load circuit 4 includes: a vehicle accessory 42, output converter 43 to which the drive motor M is connected, and load power lines 41$p$, 41$n$ which connect this vehicle accessory 42 and output converter 43 with the first power circuit 2.

The vehicle accessory 42 is configured by a plurality of electrical loads such as a battery heater, air compressor, DC/DC converter, and onboard charger. The vehicle accessory 42 is connected to the first power lines 21$p$, 21$n$ of the first power circuit 2 by the load power lines 41$p$, 41$n$, and operates by consuming the electric power of the first power lines 21$p$, 21$n$. The information related to the operating state of various electrical loads constituting the vehicle accessory 42 is sent to the management ECU 71, for example.

The power converter 43 is connected to the first power lines 21$p$, 21$n$ so as to be parallel with the vehicle accessory 42, by the load power lines 41$p$, 41$n$. The power converter 43 converts the electric power between the first power lines 21$p$, 21$n$ and the drive motor M. The power converter 43, for example, is a PWM inverter according to pulse width modulation, provided with a bridge circuit configured by a bridge connecting a plurality of switching elements (e.g., IGBT), and is equipped with a function of converting between DC power and AC power. The power converter 43 is connected to the first power lines 21$p$, 21$n$ on the DC I/O side thereof, and is connected to each coil of the U phase, V phase and W phase of the drive motor M at the AC I/O side thereof. The power converter 43 converts the AC power of the first power lines 21$p$, 21$n$ into three-phase AC power and supplies to the drive motor M, by ON/OFF driving the switching elements of each phase in accordance with a gate drive signal generated at a predetermined timing from a gate drive circuit (not shown) of the motor ECU 72, and thus generates drive torque in the drive motor M, and converts the three-phase AC power supplied from the drive motor M into DC power and supplies to the first power lines 21$p$, 21$n$, and thus generates regenerative braking torque in the drive motor M.

The voltage converter 5 connects the first power circuit 2 and second power circuit 3, and converts the voltage between both circuits 2, 3. A known boost circuit is used in this voltage converter 5.

Figure 2:
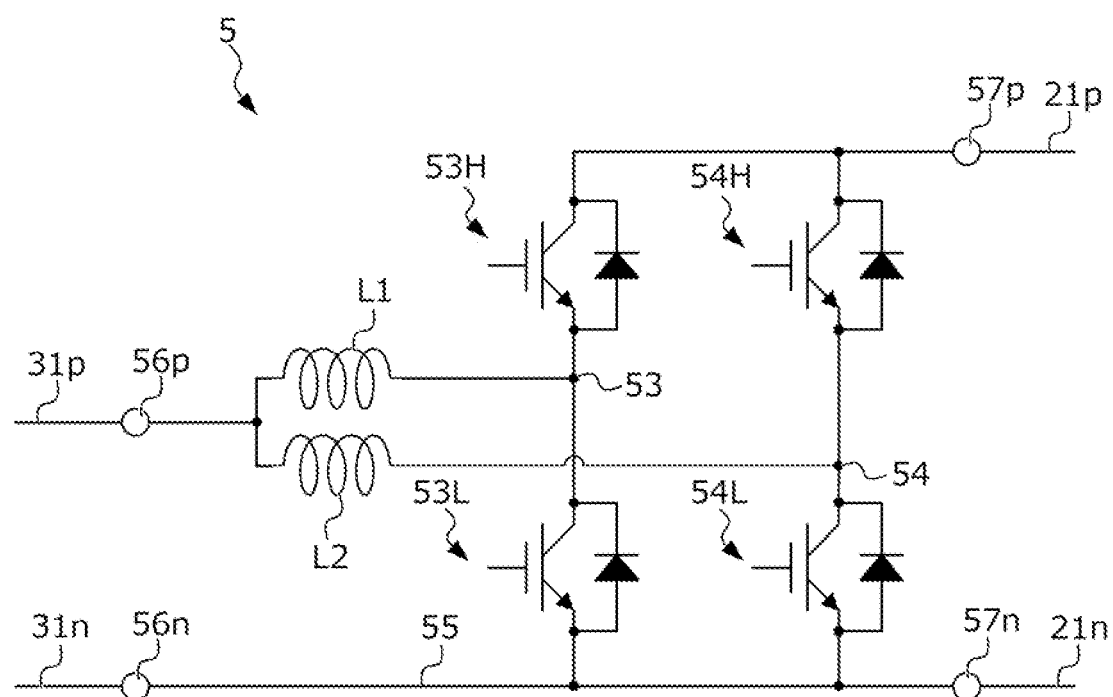
FIG. 2 is a view showing an example of a circuit configuration of a voltage converter.

FIG. 2 is a view showing an example of the circuit configuration of the voltage converter 5. The voltage converter 5 connects the first power lines 21p, 21n to which the first battery B1 is connected, and the second power lines 31p, 31n to which the second battery B2 is connected, and converts the voltage between these first power lines 21p, 21n and second power lines 31p, 31n. The voltage converter 5 is a full-bridge DC/DC converter configured by combining a first reactor L1, a second reactor L2, a first high-arm element 53H, a first low-arm element 53L, a second high-arm element 54H, a second low-arm element. 54L, a negative bus 55, low-voltage side terminals 56p, 56n, high-voltage side terminals 57p, 57n, and a smoothing capacitor (not shown).

The low-voltage side terminals 56p, 56n are connected to the second power lines 31p, 31n, and the high-voltage side terminals 57p, 57n are connected to the first power lines 21p, 21n. The negative bus 55 is wiring connecting the low-voltage side terminal 56n and high-voltage side terminal 57n.

The first reactor L1 has one end side thereof connected to the low-voltage side terminal 56p, and the other end side connected to a connector node 53 between the first high-arm element 53H and first low-arm element 53L. The first high-arm element 53H and first low-arm element 53L each include a well-known power switching element such as IGBT or MOSFET, and a freewheeling diode connected to this power switching element. This high-arm element 53H and low-arm element 53L are connected in this order in series between the high-voltage side terminal 57p and negative bus 55.

A collector of the power switching element of the first high-arm element 53H is connected to the high-voltage side terminal 57p, and the emitter thereof is connected to the collector of the first low-arm element 53L. The emitter of the power switching element of the first low-arm element 53L is connected to the negative bus 55. The forward direction of the freewheeling diode provided to the first high-arm element 53H is a direction from the first reactor L1 towards the high-voltage side terminal 57p. In addition, the forward direction of the freewheeling diode provided to the first low-arm element 53L is a direction from the negative bus 55 towards the first reactor L1.

The second reactor L2 has one end side connected to the low-voltage side terminal 56p, and the other end side connected to a connection node 54 between the second high-arm element 54H and second low-arm element 54L. The second high-arm element 54H and second low-arm element 54L each include a well-known power switching element such as IGBT or MOSFET, and a freewheeling diode connected to this power switching element. This high-arm element 54H and low-arm element 54L are connected in this order in series between the high-voltage side terminal 57p and negative bus 55.

A collector of the power switching element of the second high-arm element 54H is connected to the high-voltage side terminal 57p, and the emitter thereof is connected to the collector of the second low-arm element 54L. The emitter of the power switching element of the second low-arm element 54L is connected to the negative bus 55. The forward direction of the freewheeling diode provided to the second high-arm element 54H is a direction from the second reactor L2 towards the high-voltage side terminal 57p. In addition, the forward direction of the freewheeling diode provided to the second low-arm element 54L is a direction from the negative bus 55 towards the second reactor L2.

The voltage converter 5 converts the voltage between the first power lines 21p, 21n and the second power lines 31p, 31n, by alternately driving ON/OFF the first high-arm element 53H and second low-arm element 54L, and the first low-arm element 53L and second high-arm element 54, in accordance with the gate drive signal generated at a predetermined timing from a gate drive circuit (not shown) of the converter ECU 73.

Referring back to FIG. 1, the static voltage of the second battery B2 during travel of the vehicle V is basically maintained lower than the static voltage of the first battery B1 as mentioned above. Therefore, the voltage of the first power lines 21p, 21n is basically higher than the voltage of the second power lines 31p, 31n. Therefore, the converter ECU 73, in a case of driving the drive motor M using both the power outputted from the first battery B1 and the power outputted from the second battery B2, operates the voltage converter 5 so that a boost function is exhibited in the voltage converter 5. Boost function refers to a function of stepping up the power of the second power lines 31p, 31n to which the low-voltage side terminals 56p, 56n are connected, and outputting to the first power lines 21p, 21n to which the high-voltage side terminals 57p, 57n are connected, whereby positive passing current flows from the second power lines 31p, 31n side to the first power lines 21p, 21n side. In addition, in the case of suppressing discharge of the second battery B2, and driving the drive motor M with only the power outputted from the first battery B1, the converter ECU 73 is configured so as to turn OFF the voltage converter 5, and make so that electrical current does not flow from the first power lines 21p, 21n to the second power lines 31p, 31n.

In addition, in the case of charging the first battery B1 or second battery 82 by the regenerative electric power outputted from the drive motor M to the first power lines 21p, 21n during deceleration, the converter ECU 73 operates the voltage converter 5 so as to exhibit a step-down function in the voltage converter 5. Step-down function refers to a function of stepping down the electric power in the first power lines 21p, 21n to which the high-voltage side terminals 57p, 57n are connected, and outputting to the second power lines 31p, 31n to which the low-voltage side terminals 56p, 56n are connected, whereby negative passing current flows from the first power lines 21p, 21n side to the second power lines 31p, 31n side.

The first battery ECU 74 is a computer mainly handling state monitoring of the first battery B1 and the ON/OFF operation of the contactors 22p, 22n of the first power circuit 2. The first battery ECU 74, based on a known algorithm using the detection value sent from the first battery sensor unit 81, calculates various parameters representing the internal state of the first battery B1, more specifically, the temperature of the first battery B1, internal resistance of the first battery B1, static voltage of the first battery B1, closed-circuit voltage of the first battery B1, first SoC of the first battery B1, first output limit of the first battery B1, first regeneration limit of the first battery B1, etc. The information related to the parameters representing the internal state of the first battery B1 acquired in the first battery ECU 74 is sent to the management ECU 71, for example.

Herein, first output limit of the first battery B1 is a parameter indicating the output performance of the first battery B1, and is a value corresponding to the upper limit for the positive power capable of being outputted from the first battery B1. In other words, since there is a concern over the first battery B1 deteriorating if making the output power of the first battery B1 greater than the first output limit, it is preferable for the output power of the first battery B1 to limit to no more than the first output limit. There is a tendency for the first output limit of the first battery B1 declining towards 0 as the first SoC lowers. The first output limit of the first battery B1 is calculated by the first battery ECU 74 based on parameters representing the internal state of the first battery B1 such as the first SOC, temperature and internal resistance.

In addition, first regeneration limit of the first battery B1 is a parameter indicating the regeneration performance of the first battery B1, and is a negative value corresponding to the lower limit for the negative power capable of being inputted to the first battery B1. In other words, since there is a concern over the first battery B1 deteriorating if making the input power to the first battery B1 greater than the first regeneration limit, it is preferable for the input power of the first battery B1 to limit to at least the first regeneration limit. There is a tendency for the first regeneration limit of the first battery B1 rising towards 0 as the first SOC becomes higher. The first regeneration limit of the first battery B1 is calculated by the first battery ECU 74 based on parameters representing the internal state of the first battery B1 such as the first SOC, temperature and internal resistance.

The second battery ECU 75 is a computer mainly handling state monitoring of the second battery B2 and open/close operation of the contactors 32p, 32n of the second power circuit 3. The second battery ECU 75, based on a known algorithm using the detection value sent from the second battery sensor unit 82, calculates various parameters representing the internal state of the second battery B2, more specifically, the temperature of the second battery B2, internal resistance of the second battery B2, static voltage of the second battery B2, closed-circuit voltage of the second battery B2, second SOC of the second battery B2, second output limit of the second battery B2, second regeneration limit of the second battery B2, etc. The information related to the parameters representing the internal state of the second battery B2 acquired in the second battery ECU 75 is sent to the management ECU 71, for example.

Herein, second output limit of the second battery B2 is a parameter indicating the output performance of the second battery B2, and is a positive value corresponding to the upper limit for the positive power capable of being outputted from the second battery B2. In other words, since there is a concern over the second battery B2 deteriorating if making the output power of the second battery B2 greater than the second output limit, it is preferable for the output power of the second battery B2 to limit to no more than the second output limit. There is a tendency for the second output limit of the second battery B2 declining towards 0 as the second SOC lowers. The second output limit of the second battery B2 is calculated by the second battery ECU 75 based on parameters representing the internal state of the second battery B2 such as the second SOC, temperature and internal resistance.

In addition, second regeneration limit of the second battery B2 is a parameter indicating the regeneration performance of the second battery B2, and is a negative value corresponding to the lower limit for the negative power capable of being inputted to the second battery B2. In other words, since there is concern over the second battery B2 deteriorating if making the input power to the second battery B2 greater to the negative side than the second regeneration limit, the input power of the second battery B2 is preferable to limit to at least the second regeneration limit. There is a tendency for the second regeneration limit of the second battery B2 to rise towards 0 as the second SOC becomes higher. The second regeneration limit of the second battery B2 is calculated by the second battery ECU 75, based on parameters representing the internal state of the second battery B2 such as the second SOC, temperature and internal resistance.

The management ECU 71 is a computer managing mainly the flow of electric power in the overall power supply system 1. The management ECU 71 generates a torque command signal corresponding to the command for the drive torque or regenerative braking torque generated by the drive motor M, and a passing power command signal corresponding to a command for the power passing through the voltage converter 5, by executing power management processing explained by referencing FIGS. 3 to 14B later.

The motor ECU 72 is a computer mainly managing the flow of electric power from the first power circuit 2 to the electric motor M. Based on the torque command signal sent from the management ECU 71, the motor ECU 72 operates the power converter 43 so that the drive torque or regenerative braking torque according to this command generates in the drive motor M.

The converter ECU 73 is a computer which manages the flow of passing power, which is electric power passing through the voltage converter 5 mainly. The converter ECU 73 operates the voltage converter 5 so that passing power according to the command passes through the voltage converter 5, in response to the passing power command signal sent from the management ECU 71. More specifically, the converter ECU 73, based on the passing power command signal, calculates the target current, which is the target relative to the passing current of the voltage converter 5, and operates the voltage converter 5 following a known feedback control algorithm, so that passing current (hereinafter referred to as "actual passing current") detected by the current sensor 33 becomes the target current.

Figure 3:
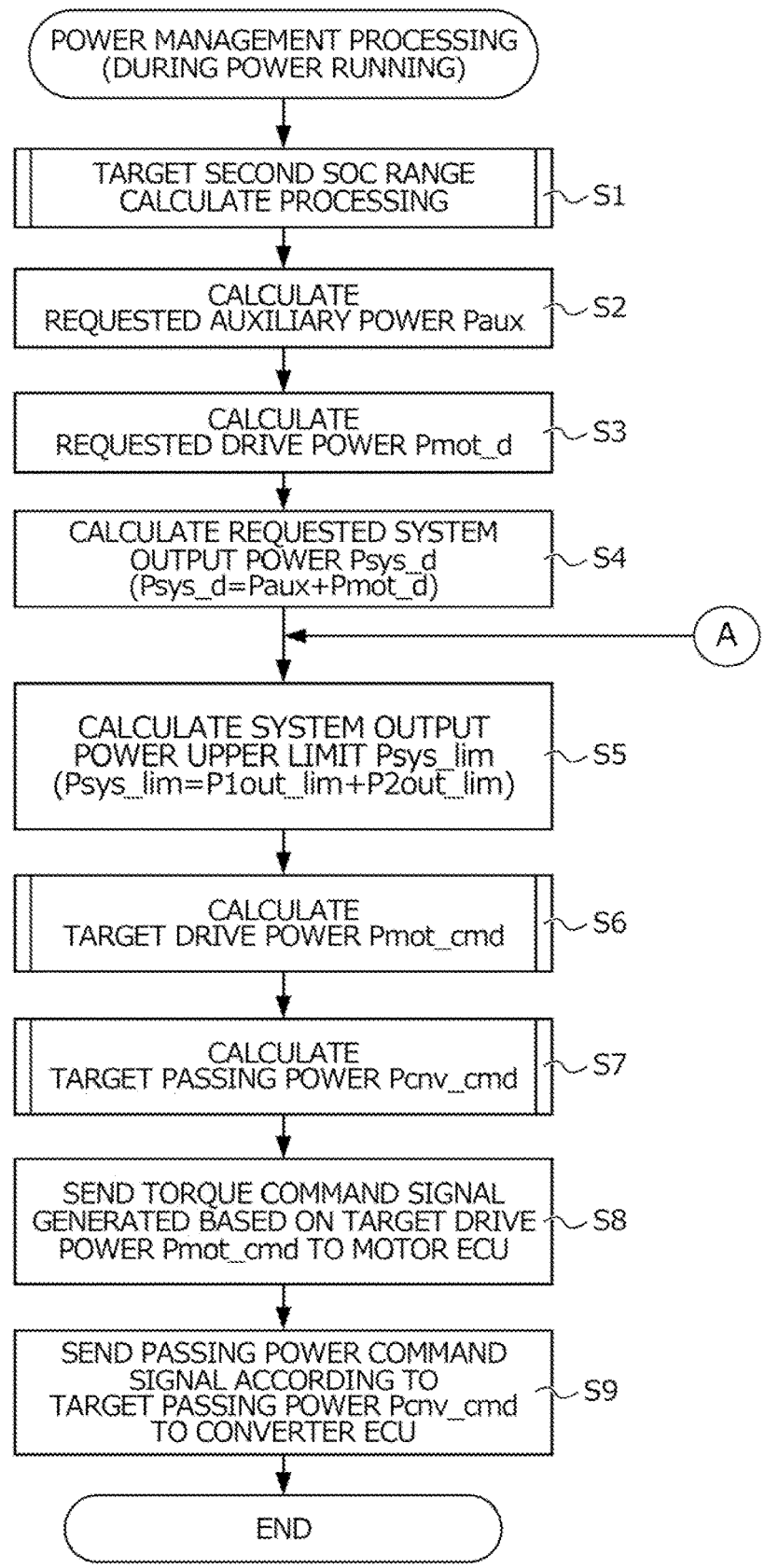
FIG. 3 is a flowchart showing a specific sequence of power management processing during powered running of a drive motor.

FIG. 3 is a flowchart showing a specific sequence of power management processing during powered running of the drive motor M. This power management processing (during powered running) is repeatedly executed at a predetermined period in the management ECU 71 during powered running of the drive motor M in which the requested drive power Pmot_d described later becomes positive.

First, in Step S1, the management ECU 71 executes the target second SOC range calculation processing of calculating the target second SOC range corresponding to the target range for the second SOC of the second battery B2, and then advances to Step S2.

Figure 4:
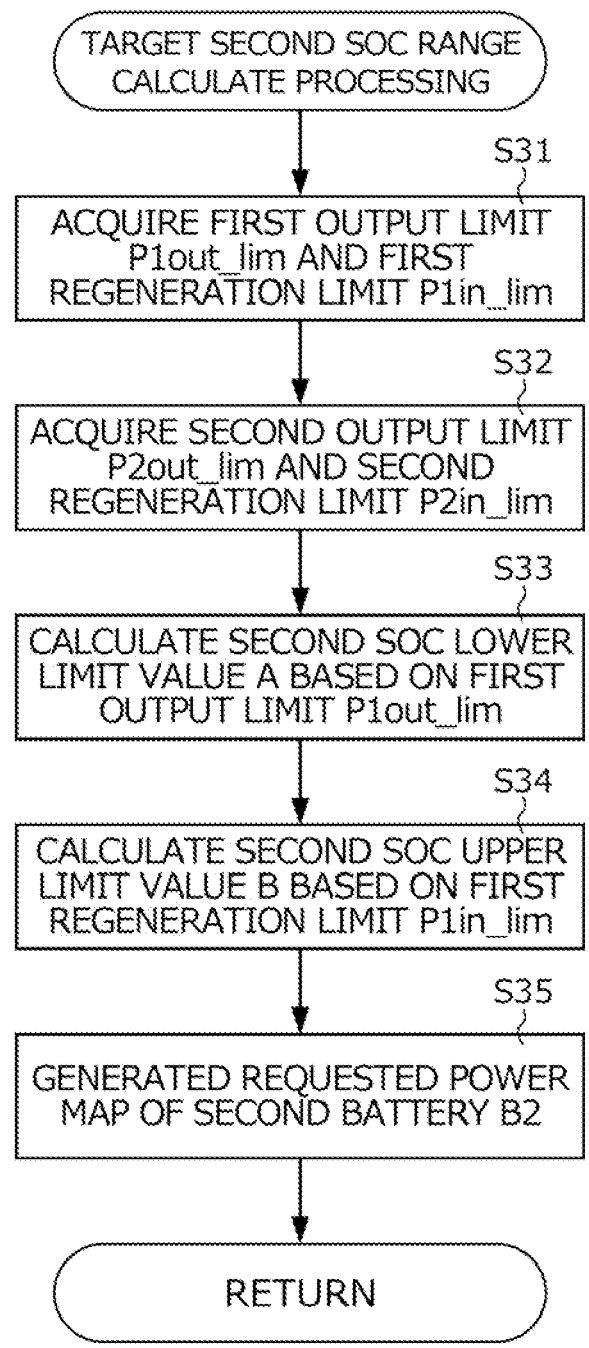
FIG. 4 is a flowchart showing a specific sequence of target second SOC range calculation processing.

FIG. 4 is a flowchart showing a specific sequence of target second SOC range calculation processing. First, in Step S31, the management ECU 71 acquires the first output limit Plout_lim (positive value) and the first regeneration limit P1in_lim (negative value) of the first battery B1 from the first battery ECU 74, and then advances to Step S32.

Next, in Step S32, the management ECU 71 acquires the second output limit P2out_lim (positive value) and the second regeneration limit P2in_lim (negative value) of the second battery B2 from the second battery ECU 75, and then advances to Step S33.

Figure 5:
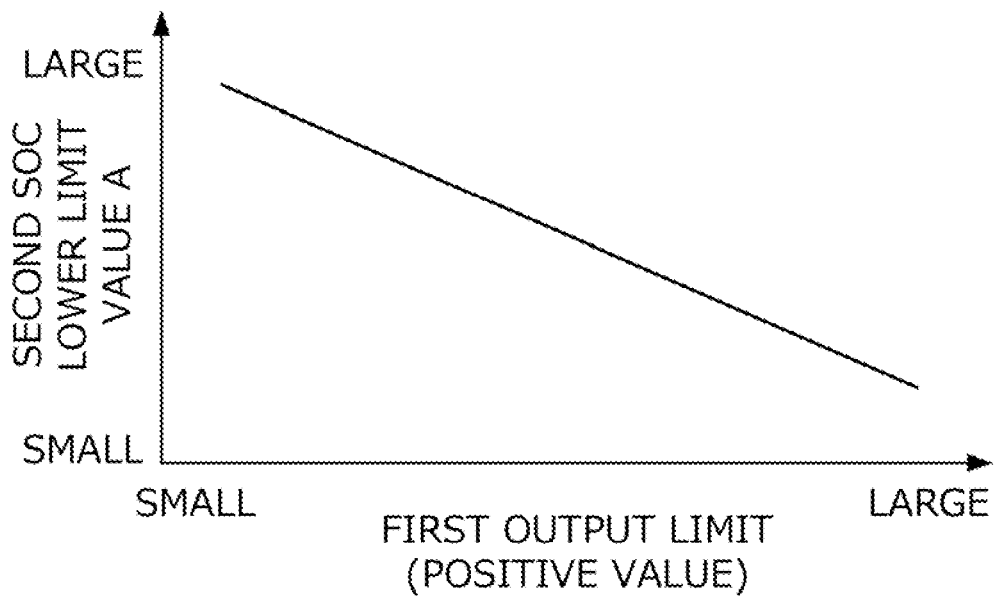
FIG. 5 is a graph showing an example of a second lower limit value map.

Next, in Step S33, the management ECU 71 calculates the second SOC lower limit value A corresponding to the lower limit value of the target second SOC range, by searching a second lower limit value map such as that illustrated in FIG. 5 based on the first output limit Plout_lim, and then advances to Step S34.

As shown in FIG. 5, the management ECU 71 sets the second SOC lower limit value A to a greater value as the first output limit Plout_lim becomes smaller, i.e. as the first SOC becomes smaller. In other words, the management ECU 71 sets the second SOC lower limit value A to a smaller value as the first output limit Plout_lim becomes larger, i.e. as the first SOC becomes larger.

Figure 6:
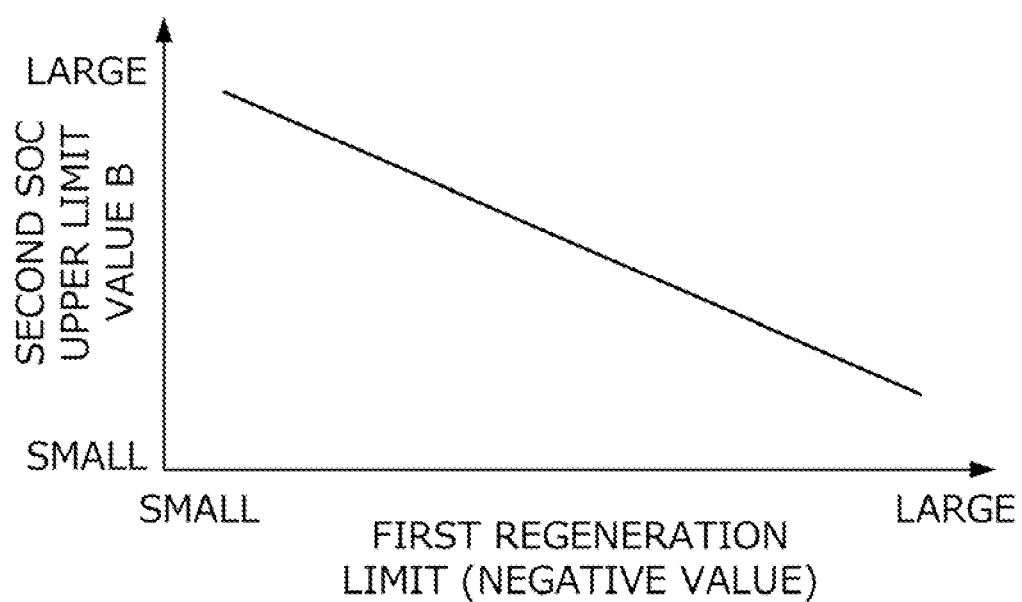
FIG. 6 is a graph showing an example of a second upper limit value map.

Next, in Step S34, the management ECU 71 calculates the second SOC upper limit value B which is set to a larger value than the aforementioned second SOC lower limit value A and corresponds to the upper limit value of the target second SOC range, by searching a second upper limit value map such as that illustrated in FIG. 6, based on the first regeneration limit P1in_lim, and then advances to Step S35.

As shown in FIG. 6, the management ECU 71 sets the second SOC upper limit value B to a smaller value as the first regeneration limit P1in_lim which is a negative value becomes larger (as P1in_lin approaches 0), i.e. as the first SOC becomes larger. In other words, the management ECU 71 sets the second SOC upper limit value B to a larger value as the first regeneration limit P1in_lim which is a negative value becomes smaller (as P1in_lim distances to the negative side from 0), i.e. as the first SOC becomes smaller.

Figure 7:
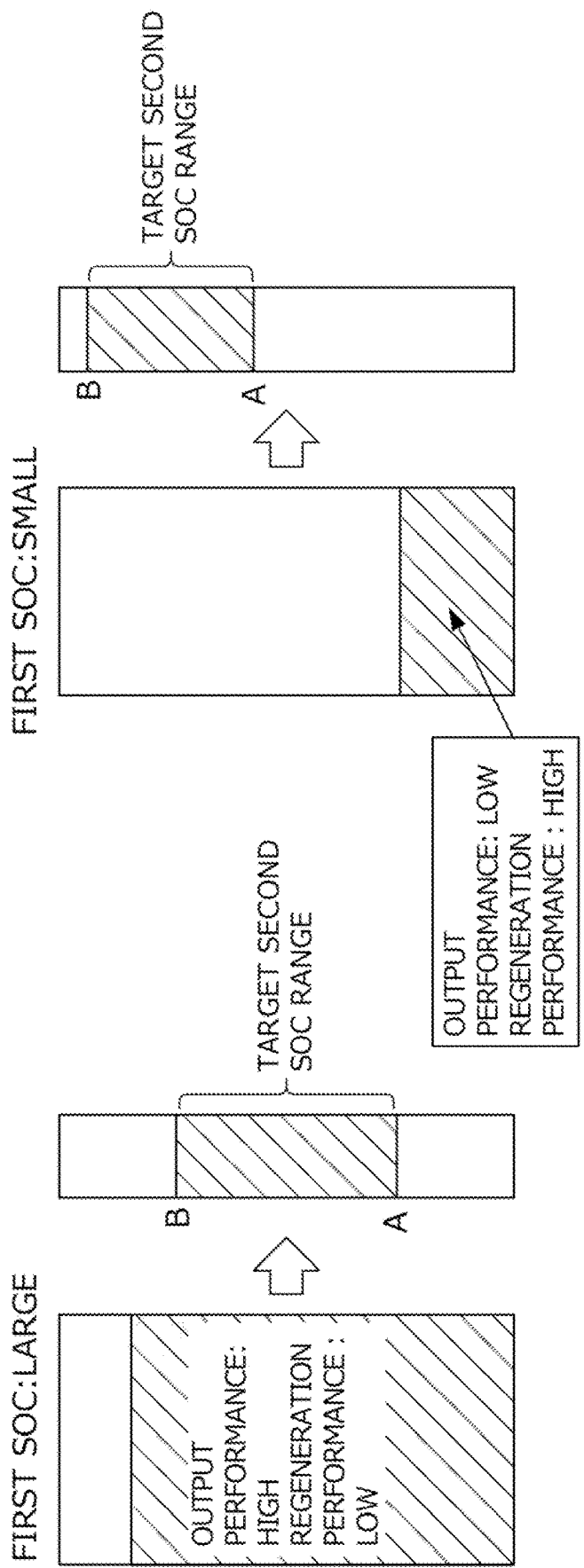
FIG. 7 is a view schematically showing a relationship between a target second SOC range and the first SOC of a first battery.

FIG. 7 is a view schematically showing the relationship between the target second SOC range calculated by the above such sequence, and the first SOC of the first battery B1. The left side of FIG. 7 shows a case of the first SOC being relatively large, and the right side shows a case of the first SOC being relatively small.

As shown on the left side of FIG. 7, the management ECU 71 sets the second SOC lower limit value A of the target second SOC range to a smaller value and sets the second SOC upper limit B of the target second SOC range to a smaller value as the first SOC becomes larger, i.e. as the output performance of the first battery B1 rises and the regeneration performance lowers. In addition, as shown on the right side of FIG. 7, the management ECU 71 sets the second SOC lower limit value A of the target second SOC range to a larger value and sets the second SOC upper limit value B of the target second SOC range to a larger value, as the first SOC becomes smaller, i.e. as the output performance of the first battery B1 becomes lower and the regeneration performance rises. In the above way, the target second SOC range changes according to the first SOC of the first battery B1.

Referring back to FIG. 4, in Step S35, the management ECU 71 generates a requested power map for determining the requested power P2_d for the second battery B2, based on the second output limit P2out_lim, second regeneration limit P2in_lim and the target second SOC range, and then advances to the processing of Step S2 in FIG. 3.

Figure 8:
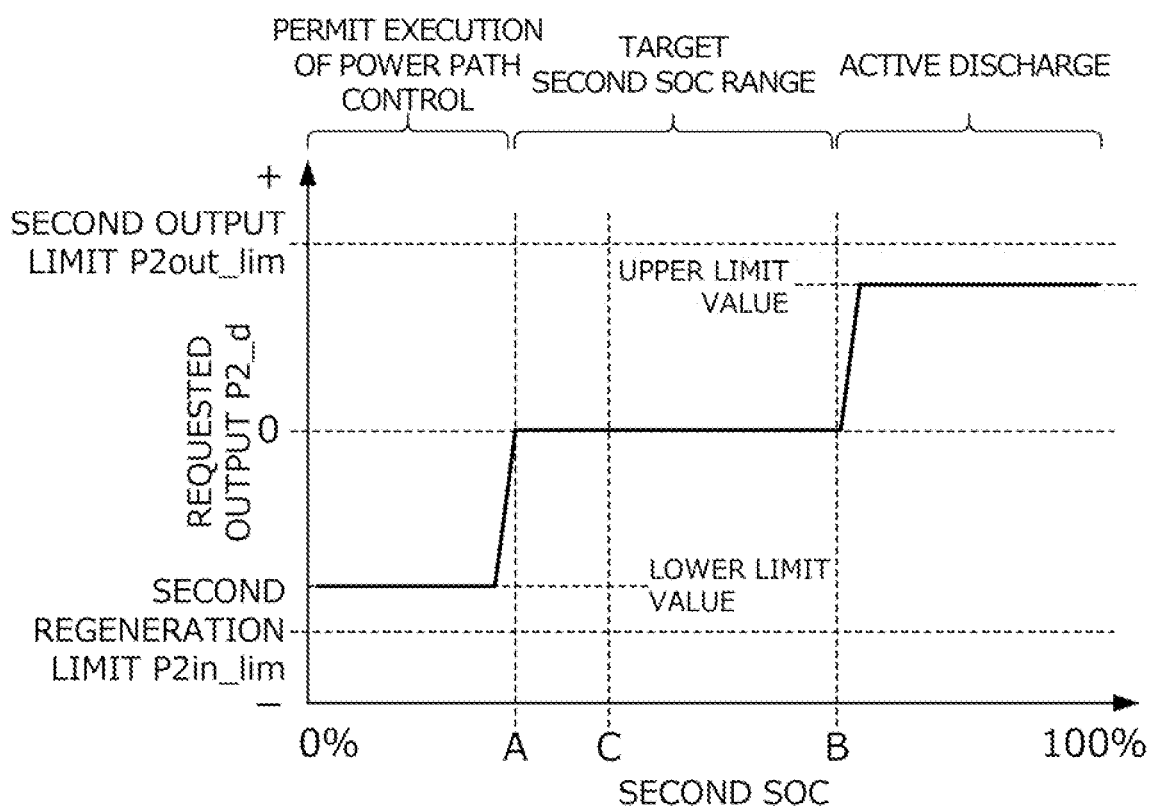
FIG. 8 is a graph showing an example of a requested power map generated by a management ECU.

FIG. 8 is a graph showing an example of the requested power map generated by the management ECU 71. As shown in FIG. 8, the requested power map is a map for calculating the requested power P2_d for the second battery B2 based on the second SOC.

The management ECU 71 generates a requested power map so that the requested power P2_d becomes 0 in the case of the second SOC being greater than the second SOC lower limit value A and no more than the second SOC upper limit value B. In the case of the second SOC being greater than the second SOC upper limit value B, the management ECU 71 generates a requested power map so that the requested power P2_d approaches a positive upper limit value decided between 0 and the second output limit P2out_lim, in accordance with the second SOC rising. In addition, in the case of the second SOC being no more than the second SOC lower limit value A, the management ECU 71 generates a requested power map so that the requested power P2_d approaches a negative lower limit value decided between 0 and the second regeneration limit P2in_lim, in accordance with the second SOC declining.

By generating the above such requested power map, the management ECU 71, in the case of the second SOC being outside the target second SOC range, controls the charging/discharging through the second SOC of the second battery B2 so that the second SOC changes towards within the target second SOC range, by making the requested power P2_d for the second battery B2 a positive value or a negative value. More specifically, the management ECU 71 causes the second SOC to decline towards within the target second SOC range by establishing the requested power P2_d as a positive value and actively inducing discharge of the second battery B2 in the case of the second SoC being greater than the second SOC upper limit value, and causing the second SOC to rise towards within the target second SOC range, by establishing the requested power P2_d as a negative value and permitting execution of the power path control of supplying the power outputted from the first battery B1 to the second battery B2, in the case of the second SOC being no more than the second SOC lower limit value A.

Referring back to FIG. 3, in Step S2, the management ECU 71 calculates the requested auxiliary power Paux which is the power requested in the vehicle auxiliary 42, and then advances to Step S3. The management ECU 71 calculates the requested auxiliary power Paux, which is a positive value, based on information related to the operating state of various electrical loads sent from the vehicle auxiliary 42.

In Step S3, the management ECU 71 calculates the requested drive power Pmot_d corresponding to the request for power supplied from the first power circuit 2 to the drive motor M via the power converter 43, during powered running of the drive motor M, and then advances to Step 34. The management ECU 71 calculates the requested drive torque correspond to the request for drive torque generated by the drive motor M based on the operation amount of pedals P such as the accelerator pedal and brake pedal (refer to FIG. 1) by the driver, and calculates the requested drive power Pmot_d, which is a positive value, by converting this requested drive torque into power.

In Step S4, the management ECU 71 calculates the requested system output power Psys_d corresponding to the request for the system output power, which is the power outputted to the load circuit 4 from the system overall combining the first battery B1 and second battery B2, by summing the requested auxiliary power Paux calculated in Step S2 and the requested drive power Pmot_d calculated in Step S3, and then advances to Step S5.

In Step S5, the management ECU 71 calculates the system output power upper limit Psys_lim, which is the upper limit for the system output power, and then advances to Step S6.

Figure 9:
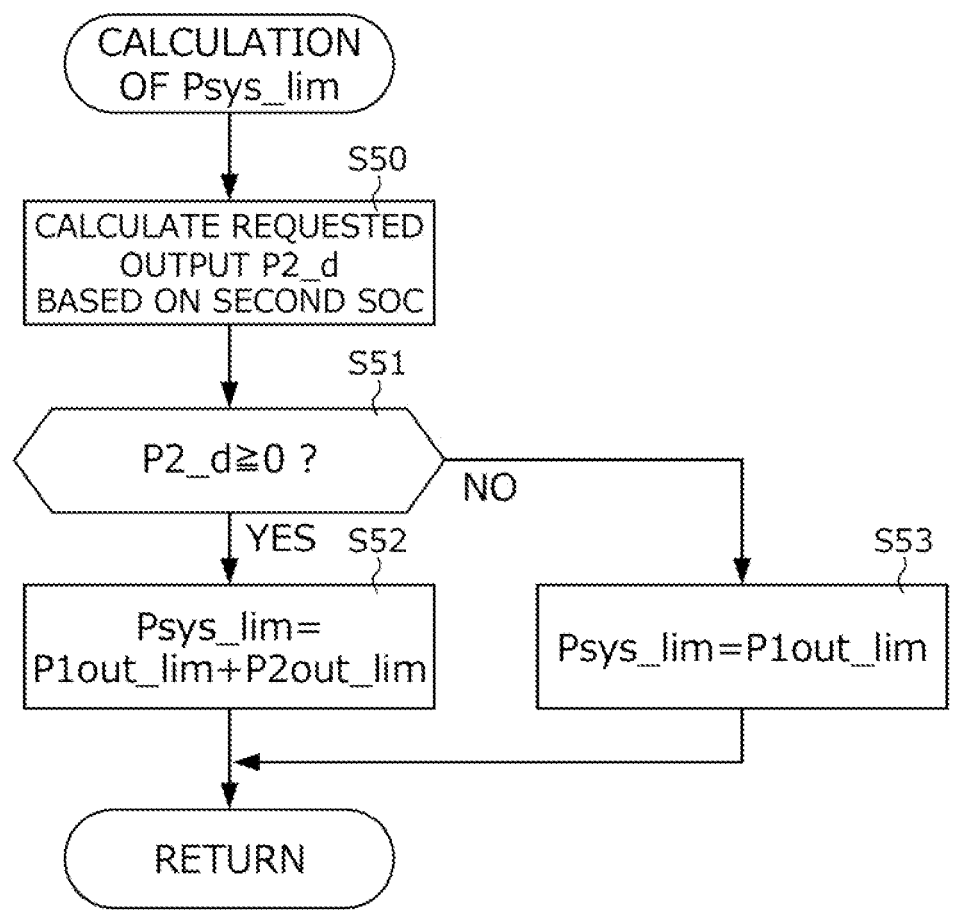
FIG. 9 is a flowchart showing a sequence of calculating a system output upper limit.

FIG. 9 is a flowchart showing a sequence of calculating the system output power upper limit Psys_lim.

First, in Step S50, the management ECU 71 acquires the second SOC of the second battery B2 from the second battery ECU 75, and calculates the requested power P2_d for the second battery B2, by searching the requested power map generated in Step S35 of FIG. 4 based on this second SOC.

Next, in Step S51, the management ECU 71 determines whether the requested power P2_d is at least 0. The management ECU 71 advances to Step S52 in the case of the determination result in Step S51 being YES, and advances to Step S53 in the case of the determination result in Step S51 being NO.

Herein, case of the determination result in Step S51 being YES corresponds to a case of the requested power P2_d for the second battery B2 being at least 0, i.e. case of discharge from the second battery B2 being permitted. Therefore, in Step S52, the management ECU 71 establishes the sum of the first output limit Plout_lim of the first battery B1 and the second output limit P2out_lim of the second battery B2 as the system output power upper limit Psys_lim, and then advances to Step S6 in FIG. 4.

In addition, case of the determination result in Step S51 being NO corresponds to a case of the requested power P2_d for the second battery B2 being less than 0, i.e. case of discharge from the second battery B2 not being permitted. Therefore, in Step S53, the management ECU 71 establishes the first output limit Plout_lim of the first battery B1 as the system output power upper limit Psys_lim, and then advances to Step S6 in FIG. 3.

In Step S6, the management ECU 71 calculates the target drive power Pmot_cmd corresponding to the target for power supplied from the first power circuit 2 to the drive motor M, and then advances to Step S7.

Figure 10:
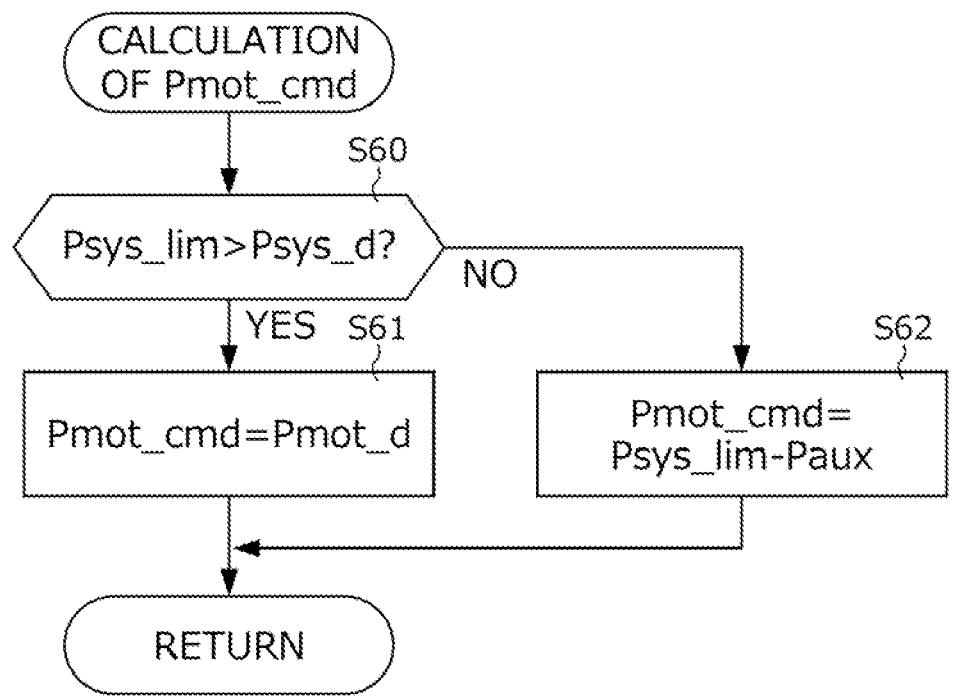
FIG. 10 is a flowchart showing a sequence of calculating a target drive power.

FIG. 10 is a flowchart showing a sequence of calculating the target drive power Pmot_cmd.

First, in Step S60, the management ECU 71 determines whether the system output power upper limit Psys_lim calculated in Step S5 is greater than the requested system output power Psys_d calculated in Step S4. The management ECU 71 advances to Step S61 in the case of the determination result in Step S60 being YES, and advances to Step S62 in the case of the determination result in Step S60 being NO.

Herein, case of the determination result in Step S60 being YES corresponds to a case of being able to output the requested drive power Pmot_d calculated in Step S3 without the system output power exceeding the upper limit thereof Psys_lim. Therefore, in Step S61, the management ECU 71 establishes the requested drive power Pmot_d calculated in Step S3 as the target drive power Pmot_cmd, and advances to Step S7 in FIG. 3.

In addition, case of the determination result in Step S60 being NO corresponds to a case of the system output power exceeding the system output power upper limit Psys_lim, when trying to output the requested drive power Pmot_d. Therefore, in Step S62, the management ECU 71 establishes a value arrived at by subtracting the requested auxiliary power Paux from the system output power upper limit Psys_lim as the target drive power Pmot_cmd, and then advances to Step S7 in FIG. 3.

Referring back to FIG. 3, in Step S7, the management ECU 71 calculates the target passing power Pcnv_cmd corresponding to the target for the passing power flowing through the voltage converter 5 from the second power circuit 3 side to the first power circuit 2 side during powered running of the drive motor (i.e. output power of the second battery B2), and then advances to Step S8.

Figure 11:
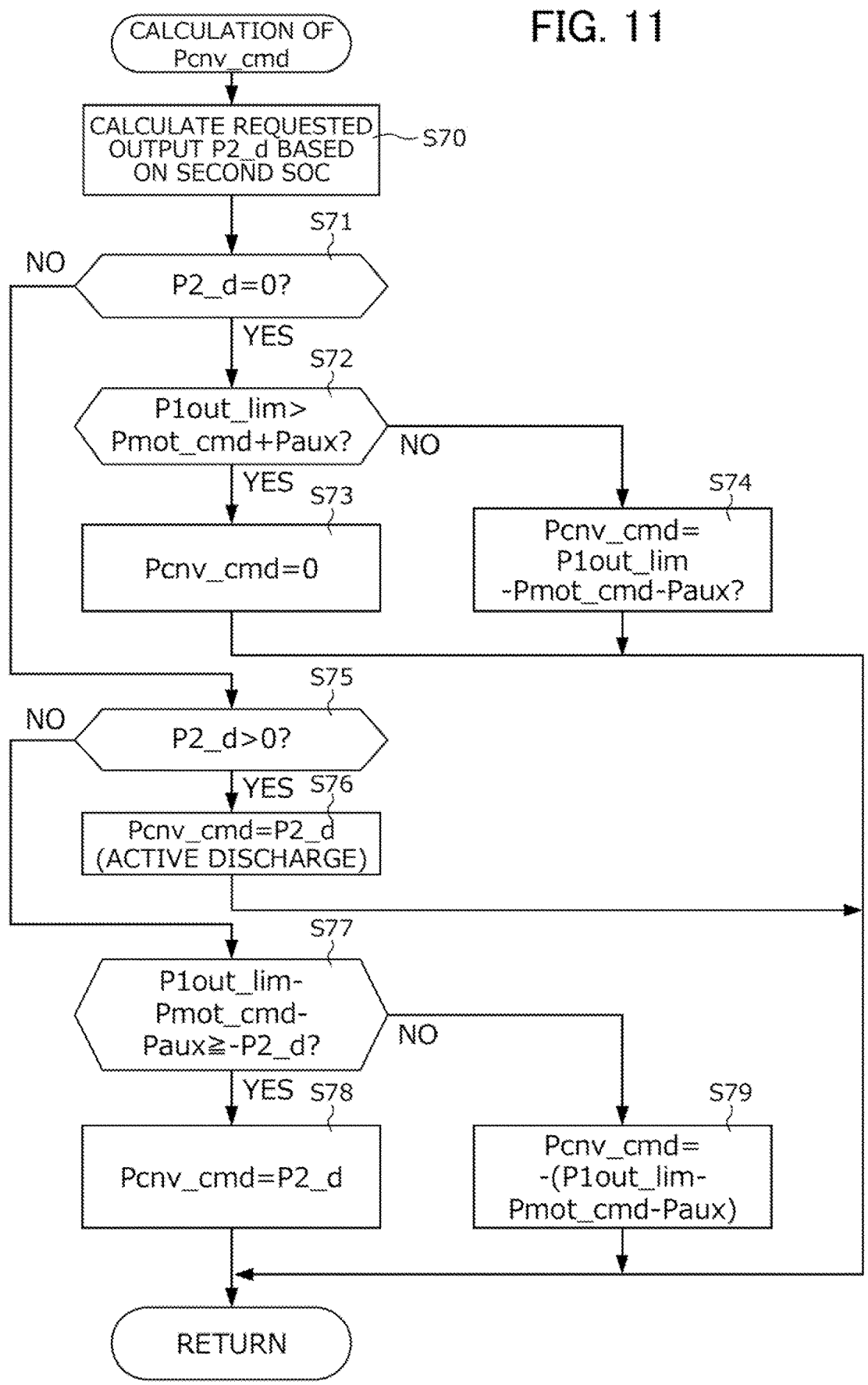
FIG. 11 is a flowchart showing a sequence of calculating a target passing power.

FIG. 11 is a flowchart showing a sequence of calculating the target passing power Pcnv_cmd.

First, in Step S70, the management ECU 71 acquires the second SOC of the second battery B2 from the second battery ECU 75, and calculates the requested power P2_d for the second battery B2 by searching the requested power map generated in Step S35 in FIG. 4 based on this second SOC, and then advances to Step S71.

Next, in Step S71, the management ECU 71 determines whether the requested power P2_d for the second battery B2 calculated in Step S70 is 0. The management ECU 71 advances to Step S72 in the case of the determination result in Step S71 being YES, and advances to Step S75 in the case of the determination result in Step S71 being NO.

Herein, case of the determination result in Step S71 being YES corresponds to a case of the requested power P2_d being 0, i.e. state in which discharge from the second battery 82 is permitted. Therefore, in the case of the requested power P2_d being 0, the management ECU 71 discharges power preferentially from the first battery B1, and in the case of a deficiency occurring with only the output power of the first battery B1, calculates a target passing power Pcnv_cmd so that this deficient amount is supplemented by the output power of the second battery B2 (refer to Steps S72 to S74).

More specifically, in Step S72, the management ECU 71 determines whether the first output limit Plout_lim is greater than the sum of the target drive power Pmot_cmd and the requested auxiliary power Paux. The management ECU 71 advances to Step S73 in the case of the determination result in Step S72 being YES, and advances to Step S74 in the case of the determination result in Step S72 being NO.

In Step S73, the management ECU 71 determines if it is necessary to discharge from the second battery B2, establishes the value 0 as the target passing power Pcnv_cmd, and then advances to Step S5 in FIG. 3.

In Step S74, the management ECU 71 establishes this deficient amount (Plout_lim−Pmot_cmd−Paux) as the target passing power Pcnv_cmd in order to supplement the amount deficient with only the first battery B1 (Plout_lim−Pmot_cmd−Paux) by the output power from the second battery B2, and then advances to Step S8 in FIG. 3.

In Step S75, the management ECU 71 determines whether the requested power P2_d for the second battery B2 is greater than 0. The management ECU 71 advances to Step S76 in the case of the determination result in Step S75 being YES, and advances to Step S77 in the case of the determination result in Step S75 being NO.

Herein, case of the determination result in Step S75 being YES corresponds to a case of the requested power P2_d being greater than 0, i.e. case of active discharge from the second battery B2 being requested. Therefore, in Step S75, the management ECU 71 establishes the requested power P2_d as the target passing power Pcnv_cmd to cause more preferential discharging from the second battery B2 than the first battery B1, and then advances to Step S5 in FIG. 3.

In addition, case of the determination result in Step 375 being NO corresponds to a case of the requested power P2_d being smaller than 0, i.e. case of execution of power path control of supplying the power outputted from the first battery B1 to the second battery B2 being permitted. Therefore, in the case of the requested power P2_d being smaller than 0, the management ECU 71 calculates the target passing power Pcnv_cmd so that the power path control is executed using the excess amount of output power of the first battery B1 (refer to Step S77 to S79).

More specifically, in Step S77, the management ECU 71 determines whether the excess amount of the first battery B1 (Plout_lim−Pmot_cmd−Paux) is at least a value arrived at by multiplying the value −1 by the requested power P2_d, which is a negative value. The management ECU 71 advances to Step S78 in the case of the determination result in Step S77 being YES, and advances to Step S79 in the case of the determination result in Step S77 being NO.

In Step S78, the management ECU 71 establishes the requested power P2_d which is a negative value as the target passing power Pcnv_cmd, and then advances to Step S8 in FIG. 3. Power according to the requested power P2_d is thereby supplied from the first battery B1 to the second battery B2. In addition, in Step S78, the management ECU 71 establishes a value arrived at by multiplying a value −1 by the excess amount of the first battery B1 (Plout_lim−Pmot_cmd−Paux) as the target passing power Pcnv_cmd, and then advances to Step S3 in FIG. 3. Power according to the excess amount (Plout_lim−Pmot_cmd−Paux) is thereby supplied from the first battery B1 to the second battery B2.

Referring back to FIG. 3, in Step S8, the management ECU 71 generates the torque command signal based on the target drive power Pmot_cmd calculated in Step S6, sends this to the motor ECU 72, and then advances to Step S9. More specifically, the management ECU 71 calculates the target drive torque by converting the target drive power Pmot_cmd into torque, and then generates a torque command signal according to this target drive torque. The motor ECU 72 operates the power converter 43 based on this torque command signal. Power according to the target drive power Pmot_cmd is thereby outputted from the first power circuit 2 to the drive motor M.

In Step S9, the management ECU 71 generates the passing power command signal according to the target passing power Pcnv_cmd calculated in Step S7, sends this to the converter ECU 73, and then ends the management processing (during powered running) shown in FIG. 3. The converter ECU 73 operates the voltage converter 5 based on this passing power command signal. Power according to the target passing power Pcnv_cmd is thereby outputted from the second battery B2 to the first power circuit 2. In addition, during execution of power path control establishing the requested power P2_d as a negative value, power according to the target passing power Pcnv_cmd which is a negative value is supplied from the first power circuit 2 to the second battery B2.

Figure 12:
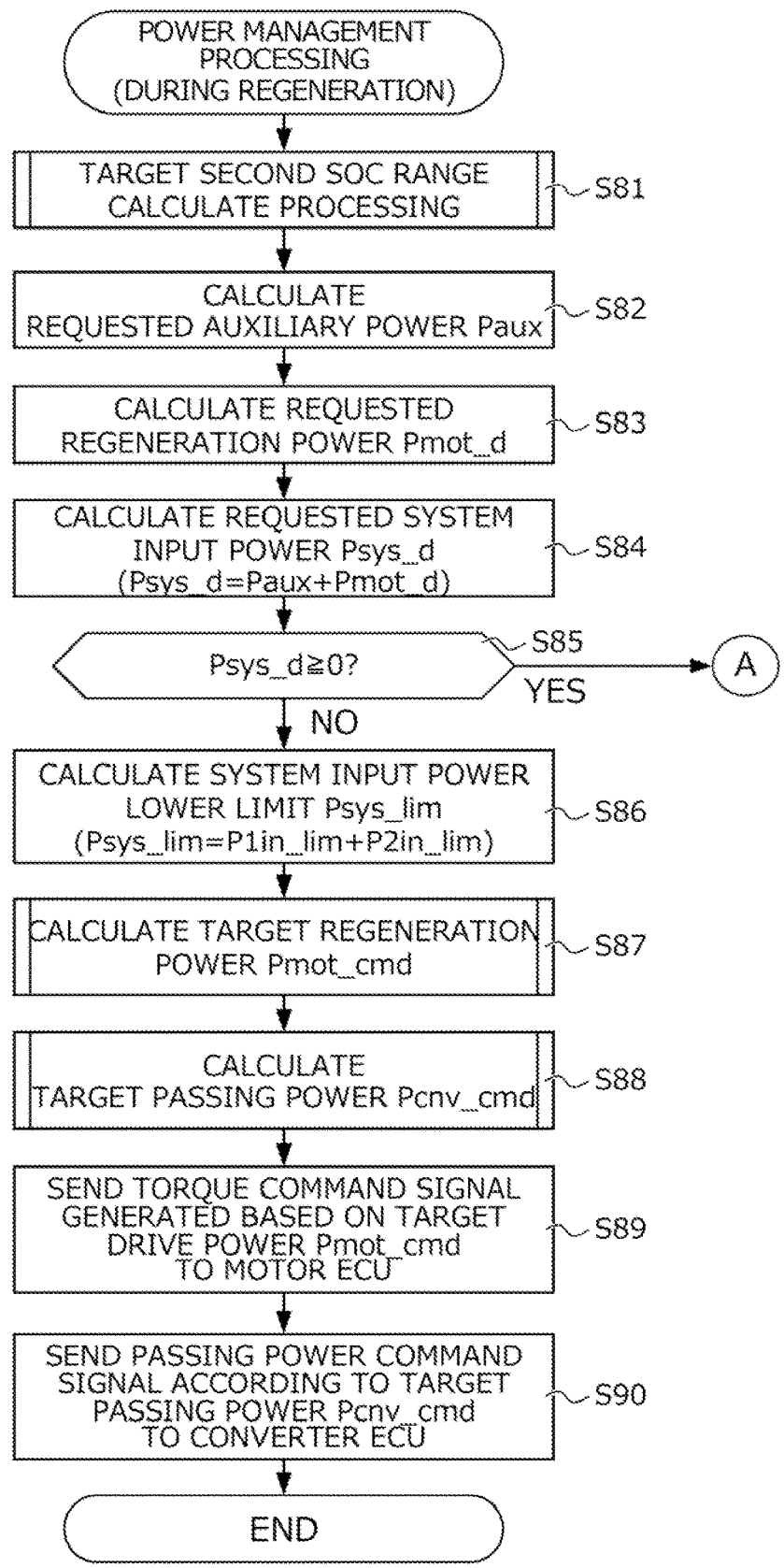
FIG. 12 is a flowchart showing a specific sequence of power management processing during regeneration of the drive motor.

FIG. 12 is a flowchart showing a specific sequence of power management processing during regeneration of the drive motor M. This power management processing (during regeneration) is repeatedly executed at a predetermined period in the management ECU 71 during regeneration of the drive motor M in which the requested regeneration power Pmot_d becomes negative.

First, in Step S81, the management ECU 71 calculates the target second SOC range and requested power map, by executing the target second SOC range calculation processing explained by referencing FIG. 4, and then advances to Step S82.

Next, in Step S82, the management ECU 71 calculates the requested auxiliary power Paux by the same sequence as Step S2 in FIG. 3, and then advances to Step S83.

In Step S83, the management ECU 71 calculates the requested regeneration power Pmot_d corresponding to a request for the power supplied from the drive motor M to the first power circuit 2 via the power converter 43 during regeneration of the drive motor M, and then advances to Step S84. The management ECU 71 calculates the requested regenerative braking torque corresponding to a request for regenerative braking torque generated by the drive motor M based on the operation amount of the pedals P such as the acceleration pedal and brake pedal (refer to FIG. 1) by the driver, and calculates the requested regeneration power Pmot_d, which is a negative value, by converting this requested regenerative braking torque into power.

In Step S4, the management ECU 71 calculates the system input power Psys_d corresponding to a request for the system input power, which is the power outputted from the load circuit 4 to the system overall combining the first battery B1 and second battery B2, by summing the requested auxiliary power Paux calculated in Step S82 and the requested regeneration power Pmot_d calculated in Step S83, and then advances to Step S85.

In Step S85, the management ECU 71 determines whether the requested system input power calculated in Step S84 is at least 0. The management ECU 71, in the case of the determination result in Step S85 being YES, i.e. case of not being able to cover the requested auxiliary power Paux with only the regeneration power outputted from the drive motor M, and being necessary to output power from at least either of the first battery B1 and second battery B2, advances to Step S5 in FIG. 3. The management. ECU 71 advances to Step S86, in the case of the determination result in Step 385 being NO, i.e. case of requiring to supply at least part of the regeneration power outputted from the drive motor M to at least either of the first battery B1 and second battery B2.

In Step S86, the management ECU 71 calculates the system input power lower limit Psys_lim of a negative value, which is the lower limit for the system input power, and then advances to Step S87. More specifically, the management ECU 71 establishes the sum of the first regeneration limit P1in_lim of the first battery B1 and the second regeneration limit P2in_lim of the second battery B2, as the system input power lower limit Psys_lim, and then advances to Step S87.

Referring back to FIG. 12, in Step S87, the management ECU 71 calculates the target regeneration power Pmot_cmd of a negative value corresponding to the target for the regeneration power supplied from the drive motor M to the first power circuit 2, and then advances to Step S88.

Figure 13:
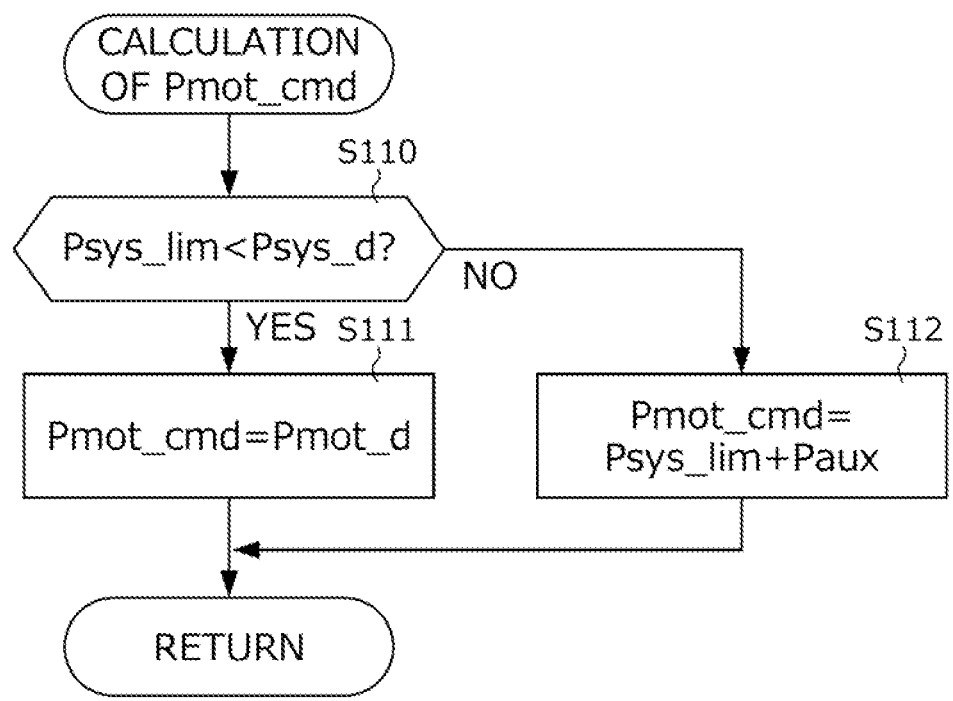
FIG. 13 is a flowchart showing a sequence of calculating a target regeneration power.

FIG. 13 is a flowchart showing a sequence of calculating the target regeneration power Pmot_cmd.

First, in Step S110, the management ECU 71 determines whether the system input power lower limit Psys_lim calculated in Step 386 is smaller than the requested system input power Psys_d calculated in Step S84. The management ECU 71 advances to Step S111 in the case of the determination result in Step S110 being YES, and advances to Step S112 in the case of the determination result in Step S110 being NO.

Herein, case of the determination result in Step S110 being YES corresponds to a case of being able to input the requested regeneration power Pmot_d calculated in Step S83 without the system input power exceeding the lower limit Psys_lim thereof. Therefore, in Step S111, the management ECU 71 establishes the requested regeneration power Pmot_d calculated in Step S83 as the target regeneration power Pmot_cmd, and then advances to Step S88 in FIG. 12.

In addition, case of the determination result in Step S110 being NO corresponds to a case of the system input power exceeding the system input power lower limit Psys_lim, when trying to input the requested regeneration power Pmot_d. Therefore, in Step S112, the management ECU 71 establishes the sum of the system input power upper limit Psys_lim which is a negative value and the requested auxiliary power Paux which is a positive value as the target regeneration power Pmot_cmd, and then advances to Step S88 in FIG. 12.

Referring back to FIG. 12, in Step S88, the management ECU 71 calculates the target passing power Pcnv_cmd of a negative value corresponding to the target for the passing power flowing through the voltage converter 5 from the first power circuit 2 side to the second power circuit 3 side during regeneration of the drive motor M (i.e. input power to the second battery B2), and then advances to Step S69.

Figure 14A:
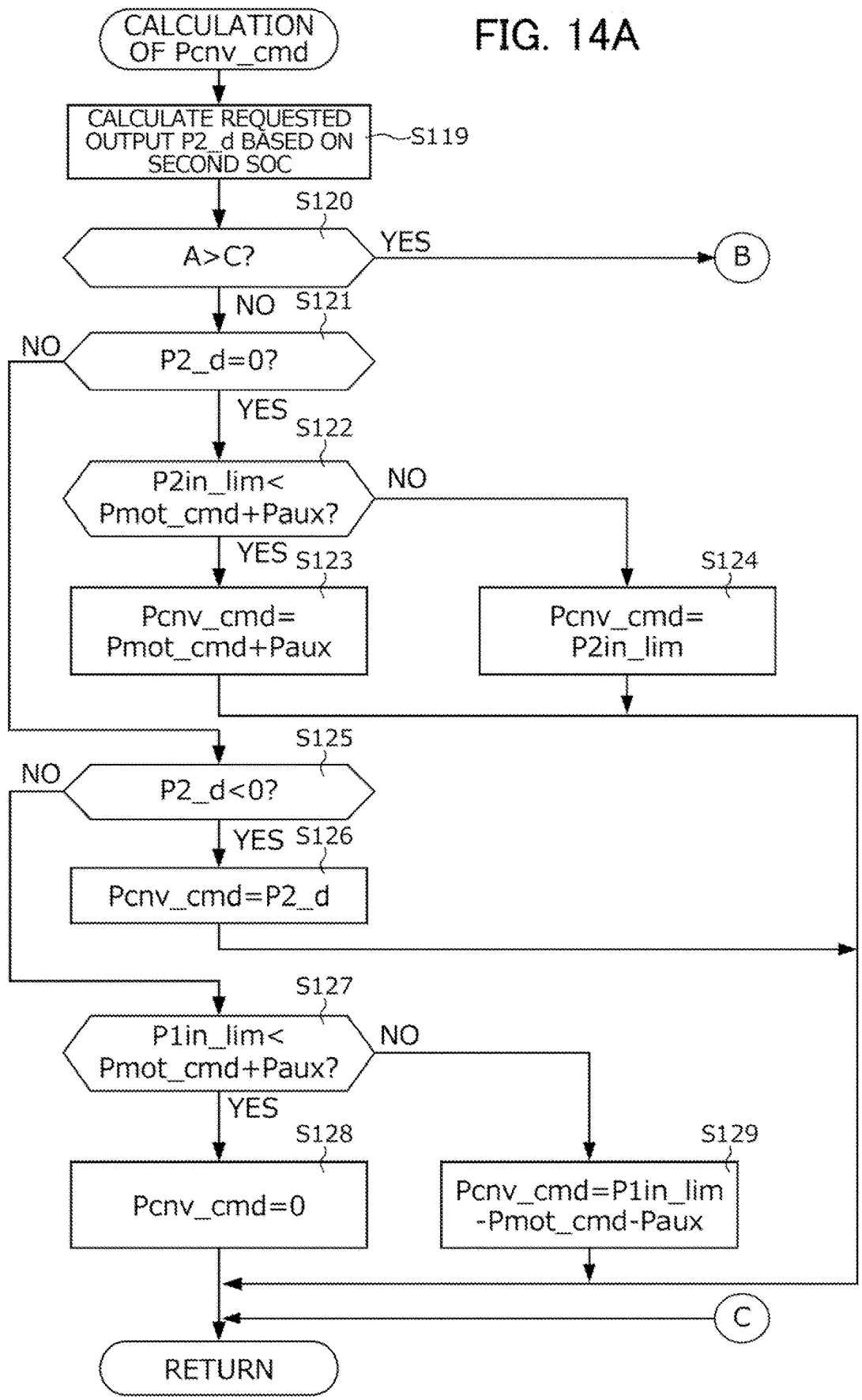
FIG. 14A is a flowchart showing a sequence of calculating a target passing power (1 of 2)
Figure 14B:
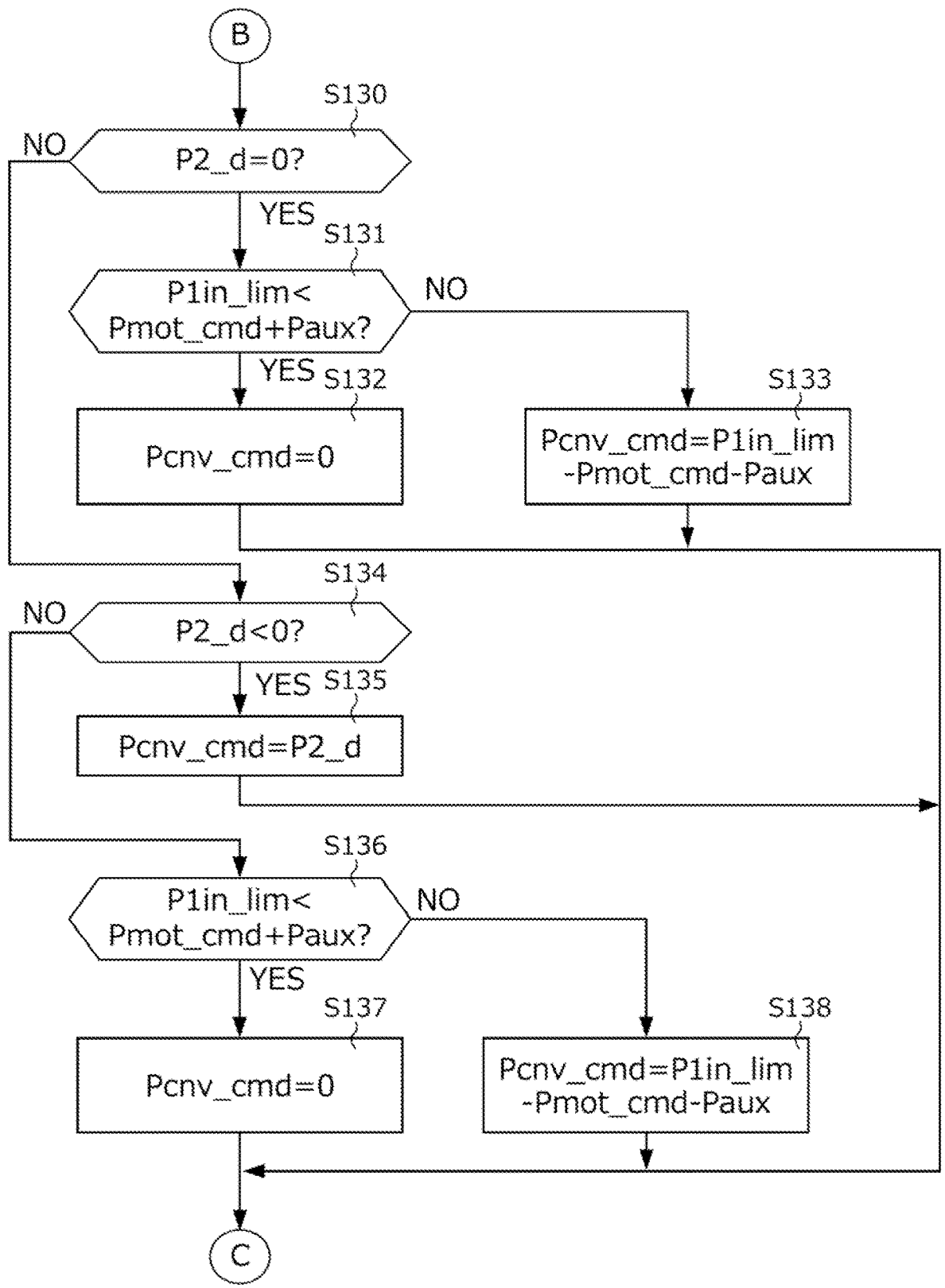
FIG. 14B is a flowchart showing a sequence of calculating a target passing power (2 of 2).

FIG. 14A and FIG. 14B are flowcharts showing a sequence of calculating the target passing power Pcnv_cmd.

First, in Step S119, the management ECU 71 acquires the second SOC of the second battery B2 from the second battery ECU 75, calculates the requested power P2_d for the second battery B2, by searching the requested power map generated in Step S35 of FIG. 4 based on this second SOC, and then advances to Step S120.

First, in Step S120, the management ECU 71 determines whether the second SOC lower limit value A calculated in the target second SOC range calculation processing of Step S81 is greater than a threshold C decided in advance (refer to FIG. 8). The management ECU 71 advances to Step S121 to supply regeneration power more preferentially to the second battery B2 than the first battery B1 in the case of the determination result in Step S120 being NO, and advances to Step S130 to supply regeneration power more preferentially to the first battery B1 than the second battery B2, in the case of the determination result in Step S120 being YES.

In Step S121, the management ECU 71 determines whether the requested power P2_d for the second battery B2 calculated in Step S119 is 0. The management ECU 71 advances to Step S122 in the case of the determination result in Step S121 being YES, and advances to Step S125 in the case of the determination result in Step S121 being NO.

Herein, case of the determination result in Step S121 being YES corresponds to a case of the requested power P2_d being 0, i.e. state in which charging of the second battery B2 is permitted. Therefore, in the case of the requested power P2_d being 0, the management ECU 71 calculates the target passing power Pcnv_cmd so as to supply the regeneration power more preferentially to the second battery B2 than the first battery B1, while supplying the excess amount which could not be recovered by the second battery B2 to the first battery B1 (refer to Steps S122 to S124).

More specifically, in Step S122, the management ECU 71 determines whether the second regeneration limit P2in_lim is smaller than the sum of the target regeneration power Pmot_cmd and the requested auxiliary power Paux. The management ECU 71 advances to Step S123 in the case of the determination result in Step S122 being YES, and advances to Step S124 in the case of the determination result in Step S122 being NO.

In Step S123, the management ECU 71 establishes the sum of the target regeneration power Pmot_cmd and requested auxiliary power Paux as the target passing power Pcnv_cmd, to recover the regeneration power with only the second battery B2, and then advances to Step S89 in FIG. 12.

In Step S124, the management ECU 71 establishes the second regeneration limit P2in_lim as the target passing power Pcnv_cmd to recover the excess amount by the first battery B1, while recovering the regeneration power by the second battery B2 up to the second regeneration limit P2in_lim thereof, and then advances to Step S89 in FIG. 12.

In Step S125, the management ECU 71 determines whether the requested power P2_d for the second battery B2 is smaller than 0. The management ECU 71 advances to Step S126 in the case of the determination result in Step S125 being YES, and advances to Step S127 in the case of the determination result in Step S125 being NO.

Herein, case of the determination result in Step S125 being YES corresponds to a case of the requested power P2_d being smaller than 0, i.e. case of execution of power path control of the second battery B2 being permitted. Therefore, in Step S126, the management ECU 71 establishes the requested power P2_d as the target passing power Pcnv_cmd to supply regeneration power more preferentially to the second battery B2 than the first battery B1, and then advances to Step S89 in FIG. 12. It should be noted that, by establishing the requested power P2_d as the target passing power Pcnv_cmd, in the case of not being able to cover the requested power P2_d with only regeneration power, this deficient amount is discharged from the first battery B1.

In addition, case of the determination result in Step S125 being NO corresponds to a case of the requested power P2_d being greater than 0, i.e. case of active discharge from the second battery B2 being requested. Therefore, in the case of the requested power P2_d being greater than 0, the management ECU 71 calculates the target passing power Pcnv_cmd so as to supply the excess amount which could not be recovered by the first battery B1 to the second battery B2, while supplying regeneration power more preferentially to the first battery B1 than the second battery B2 (refer to Steps S127 to S129).

More specifically, in Step S127, the management ECU 71 determines whether the first regeneration limit P1in_lim of the first battery B1 is smaller than the sum of the target regeneration power Pmot_cmd and the requested auxiliary power Paux. The management ECU 71 advances to Step S128 in the case of the determination result in Step 3127 being YES, and advances to Step S129 in the case of the determination result in Step 3127 being NO.

In Step S128, the management ECU 71 determines as not necessary to charge the second battery B2, establishes the value 0 as the target passing power Pcnv_cmd, and then advances to Step S89 in FIG. 12.

In Step S129, the management ECU 71 establishes this excess amount (P1in_lim−Pmot_cmd−Paux) as the target passing power Pcnv_cmd to recover the excess amount which could not be recovered by only the first battery B1 (P1in_lim−Pmot_cmd−Paux) by the second battery B2, and then advances to Step S89 in FIG. 12.

In Step S130, the management ECU 71 determines whether the requested power P2_d for the second battery B2 calculated in Step S119 is 0. The management ECU 71 advances to Step S131 in the case of the determination result in Step S130 being YES, and advances to Step S134 in the case of the determination result in Step S130 being NO.

Herein, case of the determination result in Step S130 being YES corresponds to a case of the requested power P2_d being 0, i.e. state in which charging of the second battery B2 is permitted. Therefore, in the case of the requested power P2_d being 0, the management ECU 71 calculates the target passing power Pcnv_cmd so as to supply the excess amount which could not be recovered by the first battery B1 in the second battery B2, while supplying regeneration power more preferentially to the first battery B1 than the second battery B2 (refer to Steps S131 to S133).

More specifically, in Step S131, the management ECU 71 determines whether the first regeneration limit P1in_lim is smaller than the sum of the target regeneration power Pmot_cmd and the requested auxiliary power Paux. The management ECU 71 advances to Step S132 in the case of the determination result in Step S131 being YES, and advances to Step S133 in the case of the determination result in Step S131 being NO.

In Step 3132, the management ECU 71 establishes the value 0 as the target passing power Pcnv_cmd to recover the regeneration power with only the first battery B1, and then advances to Step S89 in FIG. 12.

In Step 133, the management ECU 71 establishes this excess amount (P1in_lim−Pmot_cmd−Paux) as the target passing power Pcnv_cmd to recover the excess amount which could not be recovered by only the first battery B1 (P1in_lim−Pmot_cmd−Paux) by the second battery B2, and then advances to Step 389 in FIG. 12.

In Step 3134, the management ECU 71 determines whether the requested power P2_d for the second battery B2 is smaller than 0. The management ECU 71 advances to Step S135 in the case of the determination result in Step S134 being YES, and advances to Step S136 in the case of the determination result in Step S134 being NO.

Herein, case of the determination result in Step S134 being YES corresponds to a case of the requested power P2_d being smaller than 0, i.e. case of execution of power path control of the second battery B2 being permitted. Therefore, in Step S135, the management ECU 71 establishes the requested power P2_d as the target passing power Pcnv_cmd to supply the regeneration power more preferentially to the second battery B2 than the first battery B1, and then advances to Step S89 in FIG. 12. It should be noted that, by establishing the request power P2_d as the target passing power Pcnv_cmd, in the case of not being able to cover the requested power P2_d with only the regeneration power, this deficient amount is discharged from the first battery B1.

In addition, case of the determination result in Step S134 being NO corresponds to a case of the requested power P2_d being greater than 0, i.e. case of active discharge from the second battery B2 being requested. Therefore, in the case of the requested power P2_d being greater than 0, the management ECU 71 calculates the target passing power Pcnv_cmd so as to supply the excess amount which could not be recovered by the first battery B1 to the second battery B2, while supplying the regeneration power more preferentially to the first battery B1 than the second battery B2 (refer to Steps S136 to S138).

More specifically, in Step S136, the management ECU 71 determines whether the first regeneration limit P1in_lim of the first battery B1 is smaller than the sum of the target regeneration power Pmot_cmd and the requested auxiliary power Paux. The management ECU 71 advances to Step S137 in the case of the determination result in Step S136 being YES, and advances to Step S138 in the case of the determination result in Step S136 being NO.

In Step S137, the management ECU 71 determines as not necessary to charge the second battery B2, establishes the value 0 as the target passing power Pcnv_cmd, and then advances to Step S89 in FIG. 12.

In Step S138, the management ECU 71 establishes this excess amount (P1in_lim−Pmot_cmd−Paux) as the target passing power Pcnv_cmd to recover the excess amount which could not be recovered with only the first battery B1 (P1in_lim−Pmot_cmd−Paux) by the second battery B2, and then advances to Step S89 in FIG. 12.

Referring back to FIG. 12, in Step S89, the management ECU 71 generates a torque command signal based on the target regeneration power Pmot_cmd calculated in Step S87, sends this to the motor ECU 72, and then advances to Step S90. More specifically, the management ECU 71 calculates the target regenerative braking torque by converting the target regeneration power Pmot_cmd which is a negative value into torque, and then generates a torque command signal according to this target regenerative braking torque. The motor ECU 72 operates the power converter 43 based on this torque command signal. Power according to the target regeneration power Pmot_cmd is thereby outputted from the drive motor M to the first power circuit 2.

In Step S90, the management ECU 71 generates a passing power command signal according to the target passing power Pcnv_cmd calculated in Step S88, sends this to the converter ECU 73, and then ends the management processing (during regeneration) shown in FIG. 12. The converter ECU 73 operates the voltage converter 5 based on this passing power command signal. Power according to the target passing power Pcnv_cmd is thereby outputted from the first power circuit 2 to the second battery B2.

According to the power supply system 1 related to the present embodiment, the following effects are exerted.

(1) In the power supply system 1, the management ECU 71 permits execution of power path control to supply the power outputted from the first battery B1 of capacity type to the second battery B2, in the case of the second SOC of the second battery B2 which is of output type being less than the second SOC lower limit value A. According to the power supply system 1, in the case of the second SOC being less than the second SOC lower limit value A, it is thereby possible to raise the second SOC of the second battery B2 towards a value greater than the second SOC lower limit value A, so as to be able to exhibit the output performance thereof as requested. In addition, the management ECU 71 increases the chance of executing the power path control, by setting the second SOC lower limit value A to a greater value as the first SOC of the first battery B1 becomes smaller. In other words, the management ECU 71 can sufficiently exhibit the output performance of the second battery B2, even when the first SOC of the first battery B1 declines, by increasing the chances of executing the power path control as the first SOC of the first battery B1 becomes smaller and the chances of output from the second battery B2 being requested increases.

(2) The electronic control unit group 7 executes regeneration control to supply the regeneration power supplied from the drive motor M to the first power circuit 2 to both or either of the first battery B1 and second battery B2, during regeneration of the drive motor M. In addition, the management ECU 71 supplies regeneration power more preferentially to the first battery B1 than the second battery B2, in the case of the second SOC lower limit value A being larger than the predetermined threshold C. It is thereby possible to deplete the regeneration power by the first battery B1 having high regeneration capacity.

(3) The management ECU 71 causes the second battery B2 to discharge more preferentially than the first battery B1, in the case of the second SOC being larger than the second SOC upper limit value B set to be a larger value than the second SOC lower limit value A. Since it is thereby possible to decrease the second SOC of the second battery B2 towards between the second SOC upper limit value B and second SOC lower limit value A, it is possible to ensure free capacity for recovering the regeneration power by the second battery B2. In addition, the management ECU 71 sets the second SOC upper limit value B to a smaller value as the first SOC becomes larger, i.e. as the regeneration capacity of the first battery B1 declines. Since it is thereby possible to raise the regeneration capacity of the second battery B2 in accordance with a decline in the regeneration capacity of the first battery B1, it is possible to deplete the regeneration power by the second battery B2.

(4) In the power supply system, the management ECU 71 controls the charging and discharging of the second battery B2 so that the second SOC changes towards within the second target SOC range, in the case of the second SOC of the second battery B2 which is of output type being outside the second target SOC range between the second SOC lower limit value A and second SOC upper limit value B. According to the power supply system 1, it is thereby possible to configure so that, in the case of an output request arising, the output performance of the second battery B2 is exhibited in response to this output request, and in the case of a regeneration request arising, the second SOC is not made to greatly deviate from the second target SOC range, so as to be able to recover the regeneration power by the second battery B2 in response to this regeneration request. In addition, the management ECU 71 increases the chances of charging the second battery B2, by setting the second SOC lower limit value A to a greater value as the first SOC of the first battery B1 becomes smaller. In other words, the management ECU 71 can sufficiently exhibit the output performance of the second battery B2, even when the first SOC of the first battery B1 declines, by increasing the chances of charging the second battery B2 as the first SOC of the first battery B1 becomes smaller, and as the chances of output from the second battery B2 being requested increase.

(5) The management ECU 71 sets the second SOC upper limit value A to a smaller value as the first SOC becomes larger, i.e. as the regeneration capacity of the first battery B1 declines. Since it is thereby possible to raise the regeneration capacity of the second battery B2 in accordance with a decline in the regeneration capacity of the first battery B1, it is possible to deplete the regeneration power by the second battery B2.

Although an embodiment of the present invention has been explained above, the present invention is not to be limited thereto. The configurations of detailed parts may be modified where appropriate within the scope of the gist of the present invention.

For example, the above embodiment explains a case of establishing the first SoC of the first battery B1 as a first remaining amount parameter which increases in response to the remaining amount of the first battery B1, and establishing the second SoC of the second battery B2 as a second remaining amount parameter which increases in response to the remaining amount of the second battery B2; however, the present invention is not limited thereto. Due to the voltages of the first battery B1 and second battery B2 (particularly static voltage) also increasing in response to the respective remaining amounts, the voltages of each may be established as the remaining amount parameters.

What is claimed is:

1. A power supply system comprising:
   a load circuit containing a rotary electrical machine coupled to a drive wheel;
   a first electrical storage device;
   a second electrical storage device having higher output weight density and lower energy weight density than the first electrical storage device;
   a power circuit which connects the load circuit, the first electrical storage device and the second electrical storage device;
   a first remaining amount parameter acquisition means for acquiring a first remaining amount parameter which increases with an increase in a remaining amount of the first electrical storage device and decreases with a decrease in the remaining amount of the first storage device;
   a second remaining amount parameter acquisition means for acquiring a second remaining amount parameter which increases with an increase in a remaining amount of the second electrical storage device and decreases with a decrease in the remaining amount of the second storage device; and
   a control device which controls flow of power between the first electrical storage device, the second electrical storage device and the rotary electrical machine, and flow of power from the first electrical storage device to the second electrical storage device, by operating the power circuit,
   wherein the control device, in a case of the second remaining amount parameter being less than a second lower limit value, permits execution of power path control to supply power outputted from the first electrical storage device to the second electrical storage device, and sets the second lower limit value to a greater value as the first remaining amount parameter becomes smaller.

2. The power supply system according to claim 1, wherein the control device executes regeneration control to supply regeneration power supplied from the rotary electrical machine to the power circuit to both or either of the first electrical storage device and the second electrical storage device during regeneration of the rotary electrical machine, and supplies regeneration power more preferentially to the first electrical storage device than the second electrical storage device in a case of the second lower limit value being greater than a predetermined threshold.

3. The power supply system according to claim 2, wherein the control device more preferentially discharges the second electrical storage device than the first electrical storage device, in a case of the second remaining amount parameter being larger than a second upper limit value set to a greater value than the second lower limit value, and sets the second upper limit value to a smaller value as the first remaining amount parameter becomes larger.

4. A power supply system comprising:
   a load circuit containing a rotary electrical machine coupled to a drive wheel;
   a first electrical storage device;
   a second electrical storage device having higher output weight density and lower energy weight density than the first electrical storage device;
   a power circuit which connects the load circuit, the first electrical storage device and the second electrical storage device;
   a first remaining amount parameter acquisition means for acquiring a first remaining amount parameter which increases with an increase in a remaining amount of the first electrical storage device and decreases with a decrease in the remaining amount of the first storage device:
   a second remaining amount parameter acquisition means for acquiring a second remaining amount parameter which increases with an increase in a remaining amount of the second electrical storage device and decreases with a decrease in the remaining amount of the second storage device; and
   a control device which controls flow of power between the first electrical storage device, the second electrical storage device and the rotary electrical machine, and flow of power from the first electrical storage device to the second electrical storage device, by operating the power circuit,
   wherein the control device, in a case of the second remaining amount parameter being outside a second target remaining amount range between a second lower limit value and a second upper limit value set to a value larger than the second lower limit value, controls charging and discharging of the second electrical storage device so that the second remaining amount parameter changes towards within the second target remaining amount range, and sets the second lower limit value to a larger value as the first remaining amount parameter becomes smaller.

5. The power supply system according to claim 4, wherein the control device sets the second upper limit value to a smaller value as the first remaining amount parameter becomes larger.

* * * * *